United States Patent
Mori

(10) Patent No.: US 12,379,284 B2
(45) Date of Patent: Aug. 5, 2025

(54) GAS SENSOR AND POWDER FOR GAS SENSOR

(71) Applicant: DENSO CORPORATION, Kariya (JP)

(72) Inventor: Tomotaka Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 455 days.

(21) Appl. No.: 17/830,806

(22) Filed: Jun. 2, 2022

(65) Prior Publication Data

US 2022/0299404 A1 Sep. 22, 2022

Related U.S. Application Data

(63) Continuation of application No. PCT/JP2020/042798, filed on Nov. 17, 2020.

(30) Foreign Application Priority Data

Dec. 4, 2019 (JP) ................... 2019-219911

(51) Int. Cl.
*G01M 15/02* (2006.01)
*G01M 15/10* (2006.01)

(52) U.S. Cl.
CPC .......... *G01M 15/02* (2013.01); *G01M 15/102* (2013.01)

(58) Field of Classification Search
CPC ... G01M 15/02; G01M 15/102; C04B 35/486; G01N 27/409; G01N 27/41
See application file for complete search history.

(56) References Cited

U.S. PATENT DOCUMENTS

| 4,370,393 | A | 1/1983 | Watanabe et al. |
| 2003/0006139 | A1* | 1/2003 | Noda .................. G01N 27/4073 204/426 |
| 2006/0009344 | A1 | 1/2006 | Sone et al. |
| 2015/0293051 | A1* | 10/2015 | Kajiyama .......... G01N 27/4075 204/424 |
| 2018/0238826 | A1 | 8/2018 | Ujiyama et al. |
| 2019/0285571 | A1* | 9/2019 | Okamoto ........... G01N 27/4071 |
| 2020/0256822 | A1 | 8/2020 | Suzuki et al. |
| 2021/0072180 | A1* | 3/2021 | Itou ..................... G01N 27/409 |

FOREIGN PATENT DOCUMENTS

| EP | 0942279 B1 | * | 9/2007 | |
| JP | 2015221727 A | * | 12/2015 | |
| WO | WO-2018092702 A1 | * | 5/2018 | ........... C04B 35/486 |

* cited by examiner

*Primary Examiner* — Luan V Van
*Assistant Examiner* — Shizhi Qian
(74) *Attorney, Agent, or Firm* — Nixon & Vanderhye P.C.

(57) ABSTRACT

A gas sensor has a solid electrolyte composed of zirconia containing yttria. Designating A % as the area ratio, in an entire cross section of the solid electrolyte, of the whole cross section of regions having less than 3.3 mol % of $Y_2O_3$ relative to the total $ZrO_2$ and $Y_2O_3$, and designating B % as the area ratio, in the cross section of the solid electrolyte, of the entire cross section of regions (211) having at least 7 mol % of $Y_2O_3$ relative to the total $ZrO_2$ and $Y_2O_3$, the total area ratio (A+B) %, which is the sum of A % and B %, is 10% or more.

2 Claims, 16 Drawing Sheets

FIG.11
(a)
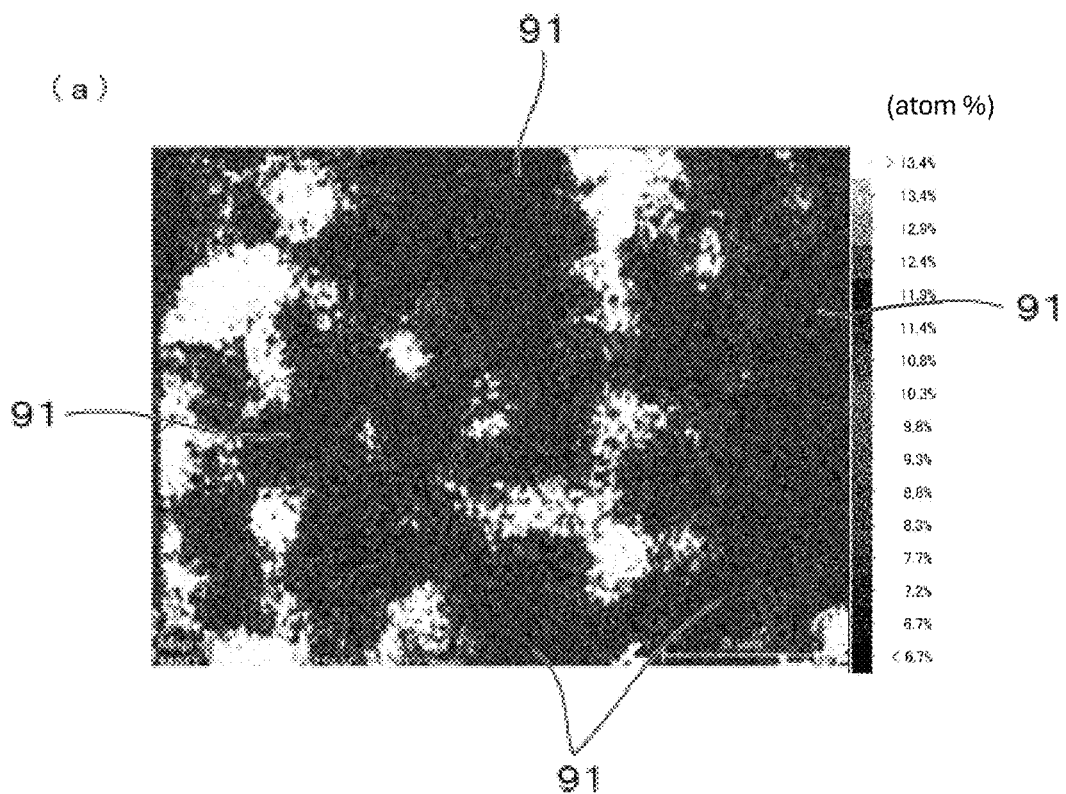
(b)
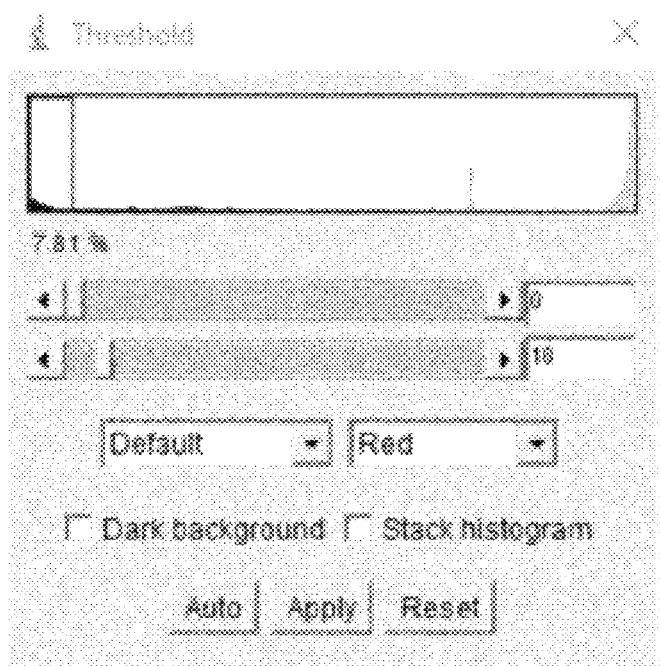

FIG.12
(a)
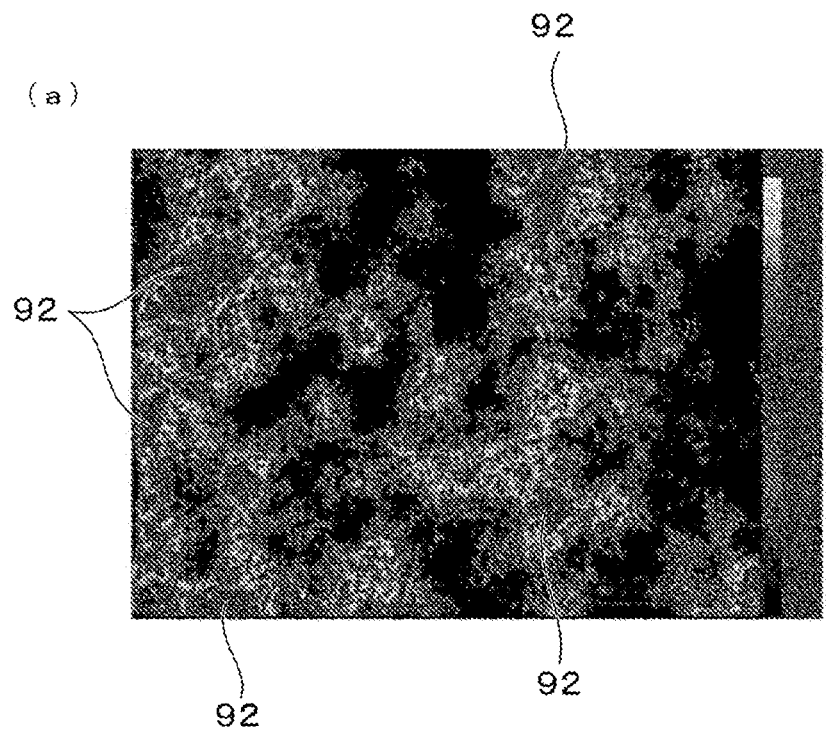
(b)
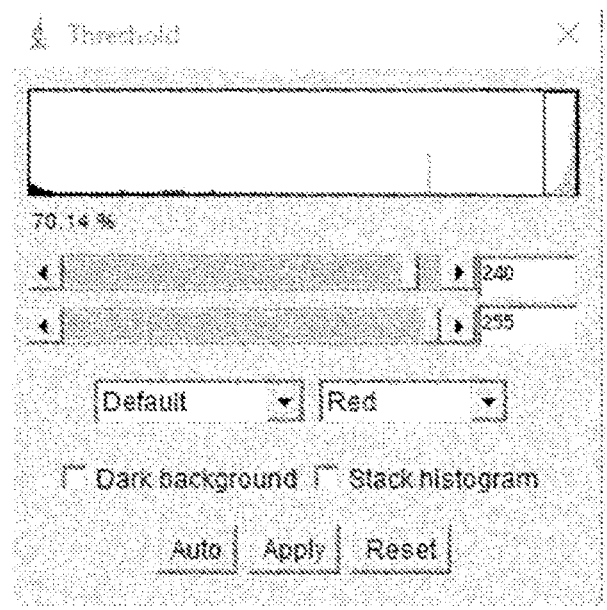

(atom %)

100~20atom%

LESS THAN 20 ~ 0 atom%

FIG.17
(a)
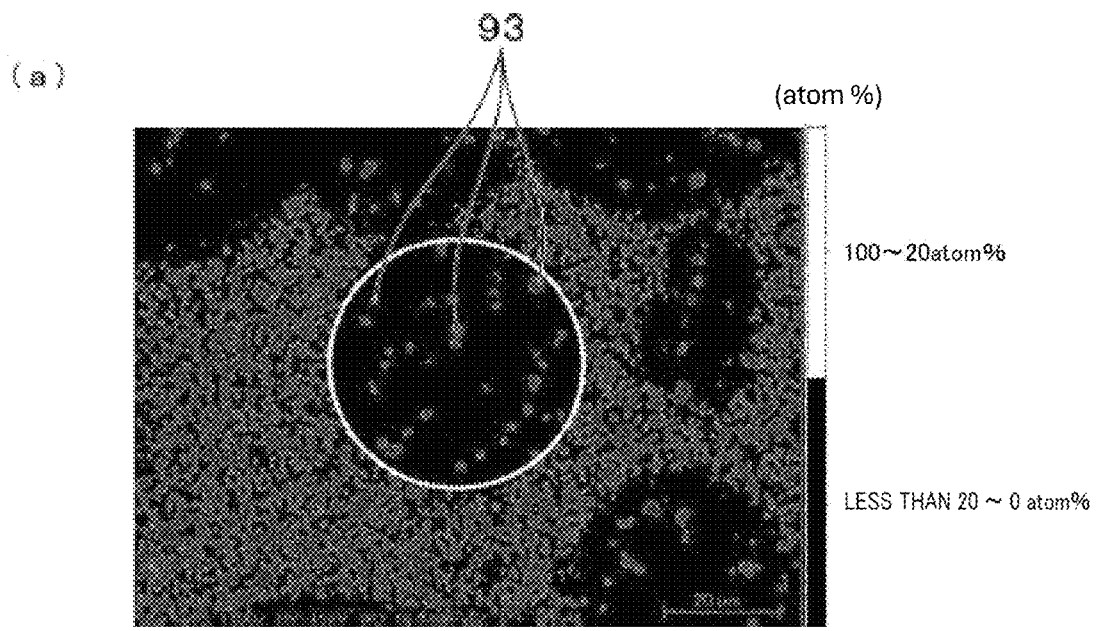
(b)
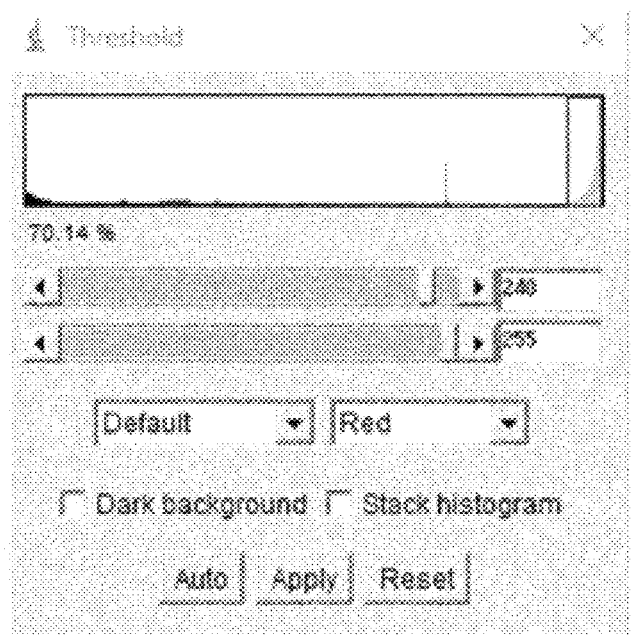

GAS SENSOR AND POWDER FOR GAS SENSOR

CROSS-REFERENCE TO RELATED APPLICATION

This application is the U.S. bypass application of International Application No. PCT/JP2020/042798 filed on Nov. 17, 2020, which designated the U.S. and claims priority to Japanese Application No. 2019-219911 filed on Dec. 4, 2019, the contents of these are incorporated herein by reference.

BACKGROUND

Technical Field

The present disclosure relates to gas sensors and powders for gas sensors.

Description of the Related Art

Conventionally, a gas sensor is attached to the exhaust pipe of an engine in an automobile for detecting a specific gas in the exhaust gas. One known form of gas sensor of this type has a solid electrolyte composed of zirconia ($ZrO_2$) containing yttria ($Y_2O_3$).

SUMMARY

One aspect of the present disclosure is a gas sensor having a solid electrolyte composed of zirconia containing yttria, wherein in an entire cross section of the solid electrolyte, the solid electrolyte has $Y_2O_3$ mol % that is in the range of 3.5 mol % or more and less than or equal to 6.9 mol % relative to the total $ZrO_2$ and $Y_2O_3$ in the cross section, and wherein in a cross section of the solid electrolyte, designating A as the area ratio of the whole cross section of regions having a $Y_2O_3$ mol % of no more than 3.3 mol % relative to the total $ZrO_2$ and $Y_2O_3$, and designating B as the area ratio of the whole of the cross sections of regions having a $Y_2O_3$ mol % of at least 7 mol % with respect to the total $ZrO_2$ and $Y_2O_3$, the total area ratio (A+B) %, which is the sum of the area ratios A % and B %, is at least 10%.

BRIEF DESCRIPTION OF THE DRAWINGS

The above objectives and other objectives, features and advantages of the present disclosure will be further clarified by the following detailed description, given with reference to the accompanying drawings. In the drawings:

FIG. 11 is a diagram for explaining image processing by ImageJ quantitative mapping of the Y element of FIG. 10, where (a) is an image when a black region in FIG. 10, where Y/(Zr+Y) atom % is 6.7 atom % or less, is extracted in red, and (b) shows the setting screen of the ImageJ threshold selection tool when obtaining the image of diagram (a).

FIG. 12 is a diagram for explaining ImageJ image processing of the quantitative mapping image of the Y element of FIG. 10, where (a) is an image when the white region in FIG. 10, where Y/(Zr+Y) atom % is 13.4 atom % or more, is extracted in red and (b) shows the setting screen of the ImageJ threshold selection tool when obtaining the image of (a).

FIG. 17 shows diagrams for explaining image processing of the quantitative mapping image of the Y element in FIG. 15 by using the ImageJ apparatus. Diagram (a) shows an image in which the white regions in FIG. 15, which have Y/(Zr+Y) atom % of 20 atom % or more, are extracted in red, and (b) shows the setting display that is obtained when the threshold selection tool of the ImageJ is applied to the image of diagram (a).

DETAILED DESCRIPTION OF THE PREFERRED EMBODIMENTS

Figure 1:
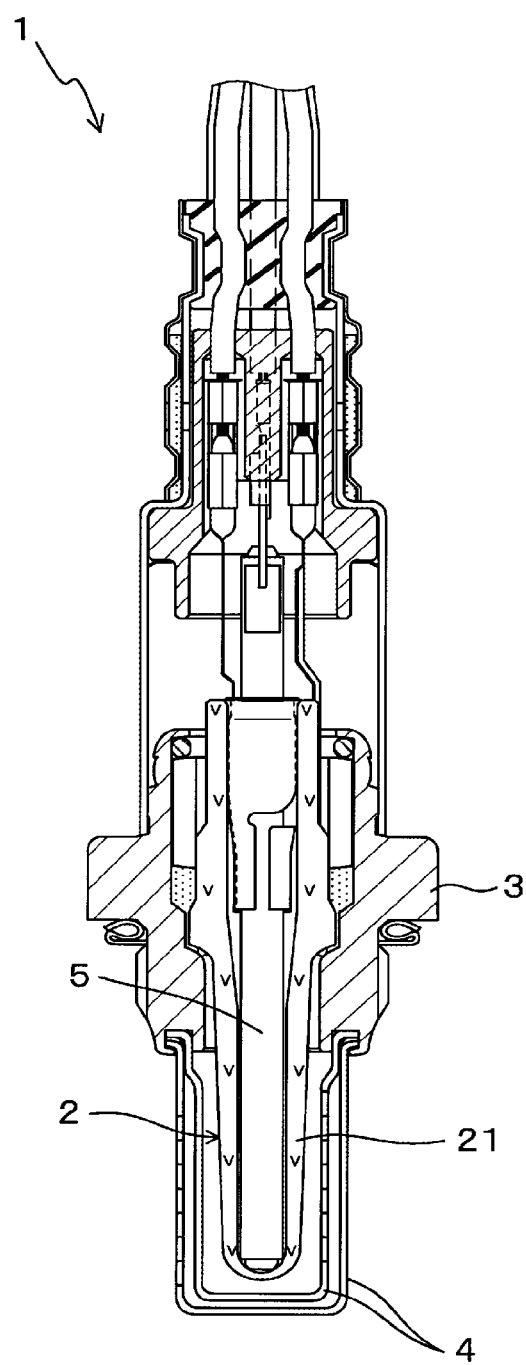
FIG. 1 is a cross-sectional view of a gas sensor (cup type) according to a first embodiment.

Conventionally, a gas sensor is attached to the exhaust pipe of an engine in an automobile for detecting a specific gas in the exhaust gas. One known form of gas sensor of this type has a solid electrolyte composed of zirconia ($ZrO_2$) containing yttria ($Y_2O_3$).

For example, Japanese Patent Application Laid-Open No. 1981-042909 discloses an oxygen sensor having a $ZrO_2$—$Y_2O_3$ system solid electrolyte in which the X-ray diffraction intensity ratios of a specific surface of a monoclinic crystal (which may be referred to as the M phase in the following) and of a specific surface of a tetragonal crystal (which may be referred to as T phase in the following), and the X-ray diffraction intensity ratios of a specific surface of a tetragonal crystal and a specific surface of a cubic crystal (which may be referred to as C phase in the following), are within a specific range.

In recent years, in the automobile field, the technology for idling stop operation and hybrid technology have become essential, due to the requirements for compliance with environmental regulations and for fuel efficiency. As a result, there is in increase in the number of times that an engine is repeatedly turned on and off, so that water tends to collect in the exhaust pipe, and hence the gas sensor mounted in the exhaust pipe tends to become exposed to increasing amounts of water. The gas sensor is thus exposed to thermal cycling, due to the high degree of heat generated by the exhaust gas and the cooling caused by the water. It has thus become necessary for the solid electrolyte used in a gas sensor to retain sufficient strength after being exposed to such thermal cycling. However, the solid electrolyte used in a conventional gas sensor has an unstable phase that undergoes phase transformation in the temperature range of 100° C. to 300° C., and cracks develop in the solid electrolyte due to the stress caused by volume changes that accompany the phase transformation. This results in decreased strength of the solid electrolyte.

According to the above-described conventional art, designating the tetragonal crystal (T phase) which, from crystallographic prediction, is readily phase-transformed, as the unstable phase, and designating the monoclinic crystal (M phase) and the cubic crystal (C phase) as the stable phases, it is attempted with the above prior art technology to improve the strength of a $ZrO_2$—$Y_2O_3$ system solid electrolyte by reducing the proportion of the T phase in the total amount of crystal, as evaluated by X ray diffraction. However, the above conventional technique simply evaluates the strength based on the initial crystal state. Even if the T phase is the same, there is a phase that undergoes crystal transformation and a phase that does not undergo crystal transformation, and if this is not taken into consideration, it is difficult to suppress the decrease in strength due to the thermal cycling simply by reducing the T phase.

With reference to the drawings, embodiments of the present disclosure will be described.

First Embodiment

Figure 2:
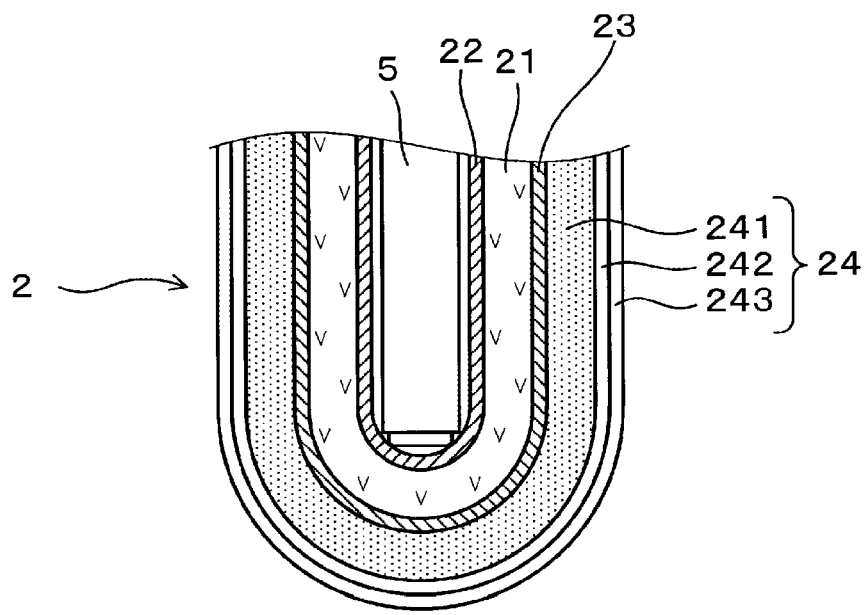
FIG. 2 is an enlarged cross-sectional view showing a part of a gas sensor element included in the gas sensor of FIG. 1.
Figure 3:
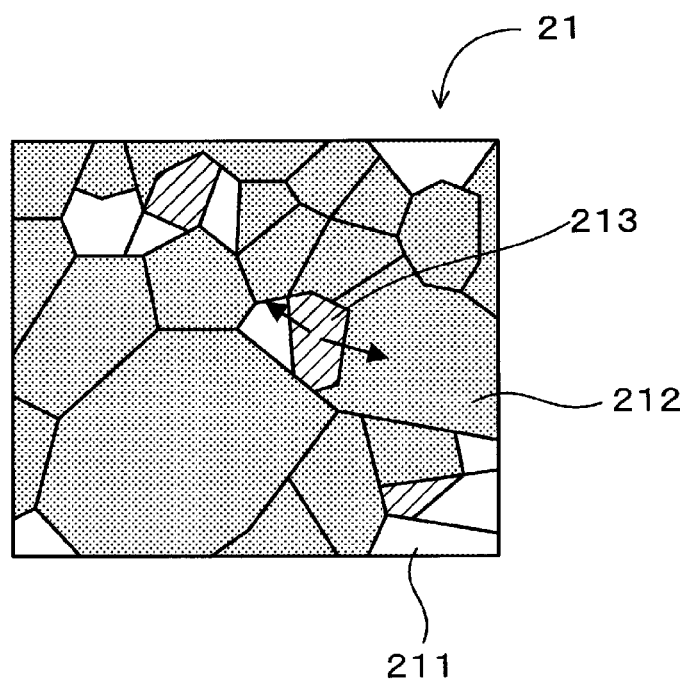
FIG. 3 is a cross-sectional diagram schematically showing the microstructure of a solid electrolyte of the gas sensor according to the first embodiment.
Figure 4:
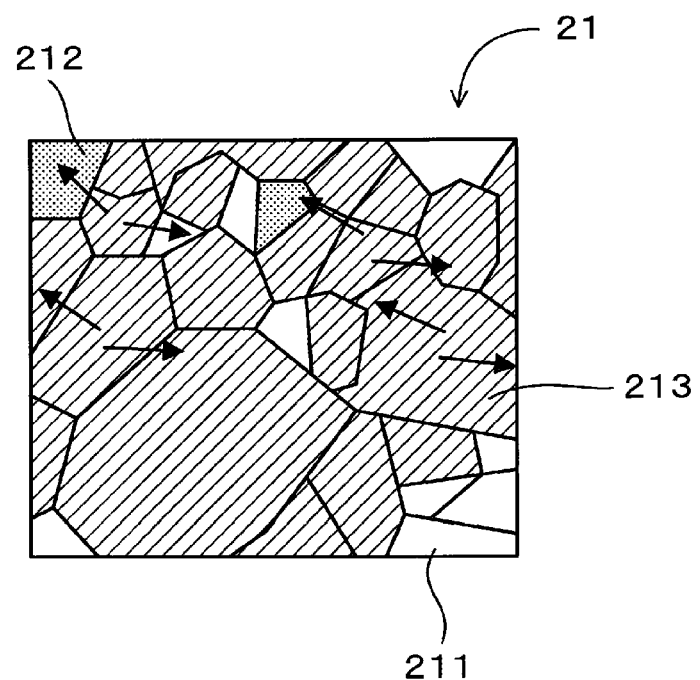
FIG. 4 is a cross-sectional diagram schematically showing the microstructure of the solid electrolyte of a comparative embodiment, for comparison with the microstructure of the solid electrolyte of the gas sensor according to the first embodiment.

As illustrated in FIGS. 1 to 6, the gas sensor 1 of the present embodiment has a solid electrolyte 21 composed of zirconia containing yttria. With the gas sensor 1 of the present embodiment, as shown in FIG. 3, the content of $Y_2O_3$ mol % in the entire cross section of the solid electrolyte 21 is in the range 3.5 mol % or more and less than or equal to 6.9 mol % relative to the total $ZrO_2$ and $Y_2O$. Furthermore as shown in FIG. 3, in the entire cross section of the solid electrolyte 21, designating A as the area ratio of the whole cross section of regions 211 having a mol % of $Y_2O_3$ that is less than or equal to 3.3 mol % relative to the total $ZrO_2$ and $Y_2O_3$, and designating B as the area ratio of the whole cross section of regions 212 having a mol % of $Y_2O_3$ that is 7 mol % or more relative to the total $ZrO_2$ and $Y_2O_3$, the sum (A+B) % of the area ratios A % and B % is 10% or more.

The mol % of $Y_2O_3$ relative to the total $ZrO_2+Y_2O_3$ (which may be referred to in the following as the assumed $Y_2O_3/(ZrO_2+Y_2O_3)$ mol %) signifies the assumed amount of $Y_2O_3$ contained in the entire solid electrolyte 21 (the amount of $Y_2O_3$ doped in the solid electrolyte 21). The assumed $Y_2O_3/(ZrO_2+Y_2O_3)$ mol % is an index relating to the water exposure strength (μL) of the solid electrolyte 21 when it is exposed to water and the gas sensor 1 is heated and used. If the assumed $Y_2O_3/(ZrO_2+Y_2O_3)$ mol %) is less than 3.5 mol % or greater than 6.9 mol %, the water exposure strength decreases. It is considered that this is because, since the difference in coefficient of thermal expansion between the solid electrolyte 21 and the electrode becomes large, stress is generated as a result of a temperature drop when the solid electrolyte 21 is exposed to water, and hence peeling of the electrode occurs. On the other hand, if the assumed $ZrO_2$ and $Y_2O_3$ mol % is in the range of 3.5 mol %-6.9 mol %, a high degree of water exposure strength can be obtained. It is considered that this is because the difference in coefficient of thermal expansion between the solid electrolyte 21 and the electrode becomes relatively small, so that stress is less likely to be generated due to a temperature drop when the solid electrolyte 21 is exposed to water, and hence peeling of the electrode is less likely to occur. Furthermore, in that case, the oxygen ion conductivity is also suitable for the gas sensor 1.

As shown in FIG. 3, in the cross section of the solid electrolyte 21, the regions 211 in which the $Y_2O_3$ mol % relative to the total $ZrO_2$ and $Y_2O_3$ is 3.3 mol % or less (which may be referred to in the following as $Y_2O_3/(ZrO_2+Y_2O_3)$ mol %), are significant as being stable regions, in which phase transformation caused by thermal cycling is unlikely to occur. The $Y_2O_3$ mol % relative to the total of $ZrO_2$ and $Y_2O_3$, may be referred to simply as $Y_2O_3/(ZrO_2+Y_2O_3)$ mol % in the following. The regions 211 will be designated as the first stable regions 211. Specifically, within the operating temperature range of the gas sensor 1 (for example, room temperature to 950° C.), the M phase in the first stable region 211 remains in a stable state, being unlikely to undergo phase transformation even when subjected to thermal cycling. The regions 212 in the cross section of the solid electrolyte 21, which have a $Y_2O_3$ mol % of at least 7% relative to the total $ZrO_2$ and $Y_2O_3$ in the cross section, are also significant as being stable regions, in which phase transformation due to the thermal cycling is unlikely to occur. These regions 212 will be referred to as the second stable regions 212. Specifically, in the second stable regions 212, the M phase is not in the metastable state, so that there are mainly the C phase and the T phase. It can be considered that the C phase and the T phase are stable because they do not undergo a phase transformation to the M phase even when subjected to thermal cycling. That is, the first stable regions 211 and the second stable regions 212

(which may be collectively referred to in the following as the stable regions 211 and 212) are regions in which the probability of phase transformation is low, even when subjected to thermal cycling. On the other hand, in the cross section of the solid electrolyte 21, the regions 213 having a $Y_2O_3$ mol % of at least 3.4 mol % and less than or equal to 6.9 mol % relative to the total $ZrO_2$ and $Y_2O_3$, are unstable regions in which phase transformation due to thermal cycling can readily occur. In these unstable regions 213, the crystal phase undergoes phase transformation into various crystal morphologies, when subjected to thermal cycling in the 0° C. to 1000° C. temperature range.

From the aspect of factors such as ensuring oxygen ion conductivity, etc., the first stable regions 211 preferably have $Y_2O_3/(ZrO_2+Y_2O_3)$ mol % of more than 0 mol %. Furthermore, in the second stable regions 212, $Y_2O_3/(ZrO_2+Y_2O_3)$ mol % is preferably made 20 mol % or less, from the aspect of suppressing leakage currents that result from crystal defects.

In the cross section of the solid electrolyte 21, designating A as the area ratio of the regions 211 in which the mol % of $Y_2O_3$ is less than or equal to 3.3 mol % relative to the total mol % of $ZrO_2$ and $Y_2O_3$ in the entire cross section, and designating B as the area ratio of the regions 212 in which the $Y_2O_3$ mol % is 7 mol % or more relative to the total mol % of $ZrO_2$ and $Y_2O_3$ in the entire cross section, the sum (A+B) % of the area ratios A % and B % is 10% or more. If the total area ratio (A+B) % in the solid electrolyte 21 is less than 10%, the strength of the solid electrolyte 21 decreases after being subjected to thermal cycling. It can be considered that is due to the fact that, if the total area ratio (A+B) % in the solid electrolyte 21 is less than 10% as illustrated in FIG. 4, the ratio of unstable regions 213 described above becomes 90% or more, as shown in FIG. 4. Hence when the solid electrolyte 21 subjected to thermal cycling in an exhaust pipe, the crystal phase undergoes phase transformation into various crystal morphologies. The stress due to the phase transformation (see arrows in FIG. 4) destroys interparticle junctions in the solid electrolyte 21 and so reduces the strength of the solid electrolyte. On the other hand, if as shown in FIG. 3 the total area ratio (A+B) % in the solid electrolyte 21 is 10% or more, the strength after the thermal cycling can be increased, by comparison with the case in which the total area ratio (A+B) % is less than 10%. It can be considered that this occurs because the ratio of the unstable regions 213 decreases and the ratio of the stable regions 211 and 212 increases, so that the stress due to the phase transformation (see arrows in FIG. 3) is reduced, fracturing of the interparticle junctions is delayed, and hence a decrease in the strength is suppressed.

The total area ratio (A+B) % in the solid electrolyte 21 is preferably made at least 20% and less than or equal to 98%. With that configuration, the proportion of stable regions 211 and 212 becomes sufficiently high, relative to the proportion of unstable regions 213, to make the strength unlikely to decrease due to stress caused by phase transformation. Hence the configuration is suitable for a cup-type gas sensor 1, which is required to have particularly high strength after being subjected to thermal cycling. However the configuration can of course be applied not only for a cup-type gas sensor 1 but also for a laminated gas sensor 1. If the total area ratio (A+B) % of the solid electrolyte 21 is less than 20% or more than 98%, then, by comparison with case where the total area ratio (A+B) % is less than 10%, the strength after thermal cycling can be increased sufficiently. However, the strength after thermal cycling tends to be somewhat lower than when the total area ratio (A+B) % is at least 20% and less than or equal to 98%. The reason for a decrease in strength after thermal cycling, if the total area ratio (A+B) % exceeds 98%, is considered to be that although the stress due to the phase transformation is reduced, the buffer phase on the thermal expansion surface is reduced. This results in an increase in the thermal expansion stress that is applied, and so causes the strength of the solid electrolyte 21 to decrease. A gas sensor 1 having a solid electrolyte 21 in which the total area ratio (A+B) % is 10% more and no more than 20%, or is more than 98%, is suitable as a layer type of gas sensor, which can use a solid electrolyte 21 having lower strength than that of a cup type gas sensor 1. However, the above configuration can of course be applied not only to a layer type of gas sensor 1, but also to a cup type gas sensor 1.

It can thus be understood that the gas sensor 1 of the present embodiment is based on the fact that the boundary between the stable phase and the unstable phase in the solid electrolyte 21 at the operating temperature of the gas sensor 1 is determined by $Y_2O_3/(ZrO_2+Y_2O_3)$ mol % in the crystal phase. In the solid electrolyte 21 of the gas sensor 1 according to the present embodiment, the $Y_2O_3$ in the solid electrolyte 21 is segregated such that the amounts become as specified above, thereby making it difficult for an unstable phase to be generated. Furthermore, with the gas sensor 1 of the present embodiment, the specifications set out above have been determined not only based on crystallographic prediction, but also in view of the probability of variations in crystal transformation when the gas sensor 1 is subjected to thermal cycling, with the variations being dependent on $Y_2O_3/(ZrO_2+Y_2O_3)$ mol %. Hence with the gas sensor 1 of the present embodiment as described above, a decrease in strength of the solid electrolyte 21 due to thermal cycling can be suppressed.

The area ratio A in the cross section of the solid electrolyte 21 is preferably made greater than 0%. With that configuration, the $Y_2O_3$ in the solid electrolyte 21 can readily be segregated as specified above, and the coefficients of thermal expansion of the solid electrolyte 21 and the electrode can be matched more easily. Furthermore, the area ratio B in the cross section of the solid electrolyte 21 may be made greater than the area ratio A. With that configuration, suppression of a decrease in the strength of the solid electrolyte 21 due to thermal cycling can be ensured.

The assumed ratio of $Y_2O_3/(ZrO_2+Y_2O_3)$ mol % in the solid electrolyte 21 can be measured by SEM-EDX analysis. Furthermore, the area ratio A, in a cross section of the solid electrolyte 21, of the whole cross section of the regions 211 having $Y_2O_3/(ZrO_2+Y_2O_3)$ mol % of less than or equal to 3.3 mol %, and the area ratio B of the regions 212 having $Y_2O_3/(ZrO_2+Y_2O_3)$ mol % of 7 mol % or more, can be measured by SEM-EDX analysis and image processing. These measurement methods are described hereinafter, in experiment examples. Furthermore, examples of a method of manufacturing the solid electrolyte 21 of the gas sensor 1 of the present embodiment will be described in the following, by second and third embodiments.

There are no particular limitations on the configuration of the gas sensor 1 of the present embodiment having the above-described solid electrolyte 21. Specifically, the gas sensor 1 can be configured to include a gas sensor element 2 having a solid electrolyte 21, a housing 3 into which the gas sensor element 2 is inserted and retained therein, a cover 4 for protecting the tip portion of the gas sensor element 2, and a heater 5 for heating the gas sensor element 2.

The gas sensor 1 may be configured, for example, as a cup-shaped gas sensor, as shown in FIG. 1. In that case, as illustrated in FIGS. 1 and 2, the gas sensor element 2 can have a solid electrolyte 21 formed with a bottomed cylindrical shape (a so-called cup type), in which one end is closed and the other end is open, a reference electrode 22 provided on an inner surface of the solid electrolyte 21 for contacting a reference gas such as atmospheric air, and a measurement electrode 23 provided on the outer surface of the cylindrical solid electrolyte 21 for contacting the exhaust gas to be measured.

The surface of the measurement electrode 23 in FIG. 2 may be covered with one or more protective layers 24. In the example shown in FIG. 2, the surface of the measurement electrode 23 is covered with a first protective layer 241, the surface of the first protective layer 241 is covered with a second protective layer 242, and the surface of the second protective layer 242 is covered with a third protective layer 243. The protective layers 24 protect the measuring electrode 23 from sulfur (S), phosphorus (P), and glassy poisonous substances, etc. contained in the exhaust gas, and can be made porous, for adjusting the rate at which gas reaches the measurement electrode 23. The material, porosity, thickness, etc. of respective protective layers 24 can be varied appropriately, in accordance with the purpose.

Figure 5:
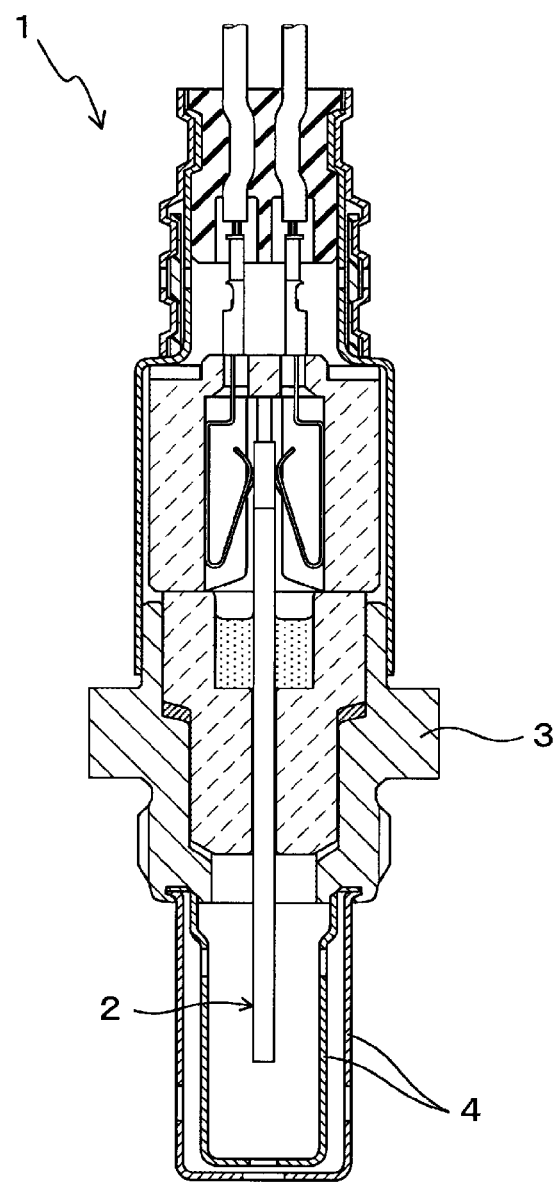
FIG. 5 is a cross-sectional view of a gas sensor (laminated type) according to the first embodiment.
Figure 6:
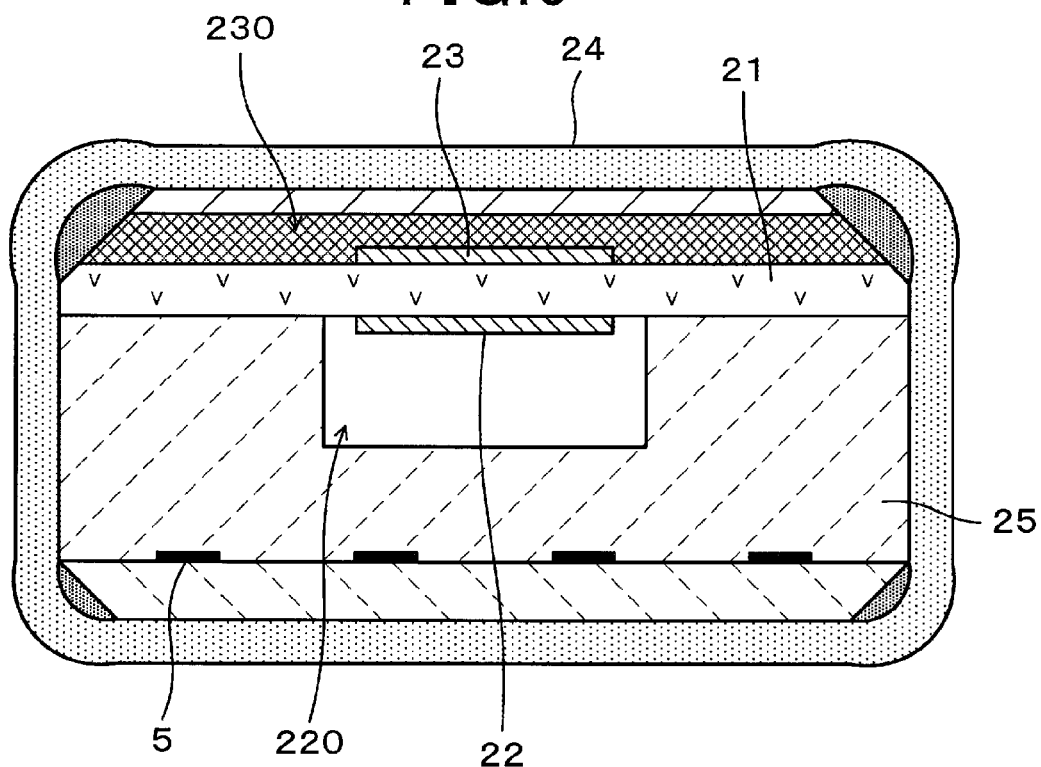
FIG. 6 is an enlarged cross-sectional view of the gas sensor element in the gas sensor of FIG. 5.

The gas sensor 1 may also be configured, for example, as a laminated gas sensor 1, as shown in the example of FIG. 5 In that case, as illustrated in FIG. 6, the gas sensor element 2 is provided with a layered solid electrolyte 21, a reference electrode 22 provided on one surface of the solid electrolyte 21, for contacting a reference gas such as the atmosphere, and a measurement electrode 23 on another surface of the solid electrolyte 21, for contacting the exhaust gas to be measured.

An exhaust gas introduction portion (not shown), disposed for introducing exhaust gas into the gas sensor element 2, is formed at the tip of the gas sensor element 2 shown in FIG. 6. A reference gas space 220, through which a reference gas flows, is provided on one surface of the solid electrolyte 21, and the reference electrode 22 is disposed on the side of the reference gas space 220. An exhaust gas space 230 through which exhaust gas flows is provided on another surface of the solid electrolyte 21, and the measurement electrode 23 is disposed on the side of the exhaust gas space 230. The other side of the solid electrolyte 21 is retained by an insulating retaining layer 25. A heater 5 for heating the gas sensor element 2 is built in the retaining layer 25. A protective layer 24 is formed on the outer peripheral surface of the gas sensor element 2, to protect the gas sensor element 2 from poisonous substances, water, and the like. Known technology can be appropriately applied to other parts of the configuration of the gas sensor 1.

Second Embodiment

A powder for a gas sensor according to a second embodiment will be described with reference to FIG. 7. In describing the second and subsequent embodiments, components, etc., that are the same as in the above embodiment are represented by the same reference designations as in the above embodiment, unless otherwise specified.

Figure 7:
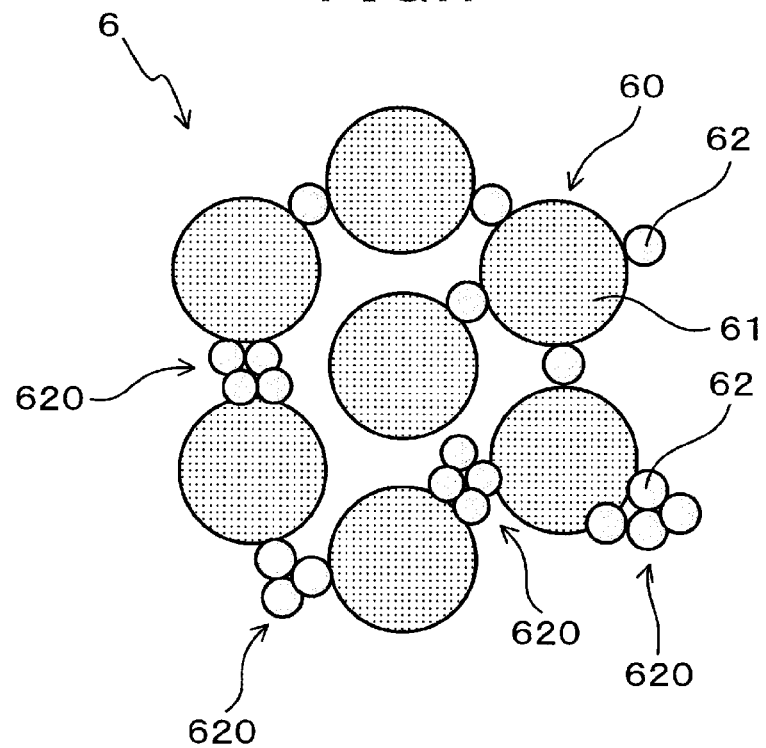
FIG. 7 is an explanatory diagram schematically showing granular particles of a powder for a gas sensor according to a second embodiment.

As illustrated in FIG. 7, the gas sensor powder 6 of the present embodiment has granular particles 60 that include a plurality of zirconia particles 61 and a plurality of yttria particles 62. In the granular particles 60, the mol % of $Y_2O_3$ relative to the total mol % of $ZrO_2$ and $Y_2O_3$ is 3.5 mol % or more and 6.9 mol % or less. The granular particles 60 include agglomerated particles 620, formed by agglomeration of the yttria particles 62. The agglomerated particle diameter of the agglomerated particles 620 is 1 µm or more.

In the granular particles 60, as illustrated in FIG. 7, the zirconia particles 61 and the yttria particles 62 are both primary particles. FIG. 7 shows an example in which the granular particles 60 are composed of a plurality of zirconia particles 61 and a plurality of yttria particles 62. The "mol % of $Y_2O_3$ relative to the total of $ZrO_2$ and $Y_2O_3$ in the granular particles 60" (which may be referred to herein simply as "the added $Y_2O_3/(ZrO_2+Y_2O_3)$ mol %)" signifies the amount of $Y_2O_3$ contained in the granular particles (the amount of $Y_2O_3$ added to the granular particles). The "added $Y_2O_3/(ZrO_2+Y_2O_3)$ mol %" (the amount of $Y_2O_3$ doped in the solid electrolyte) is an index related to the amount of $Y_2O_3$ contained in the entire solid electrolyte 21 that is formed. That is, it is an index related to the assumed $Y_2O_3/(ZrO_2+Y_2O_3)$ mol % of the solid electrolyte 21. If the added $Y_2O_3/(ZrO_2+Y_2O_3)$ mol % is less than 3.5 mol % or greater than 6.9 mol %, the assumed $Y_2O_3/(ZrO_2+Y_2O_3)$) mol % of the solid electrolyte 21 becomes out of range, and hence the solid electrolyte 21 of the first embodiment cannot be produced.

The granular particles 60 have agglomerated particles 620 formed by agglomeration of the yttria particles 62. Specifically, the agglomerated particles 620 are granular portions in which the mol % of $Y_2O_3$ relative to the total $ZrO_2$ and Y 203 is 10 mol % or more. As illustrated in FIG. 7, a plurality of agglomerated particles 620 are present on the surface of the zirconia particles 61. FIG. 7 shows an example in which yttria particles 62 having a smaller particle diameter than that of the zirconia particles 61 are present on the surface of the zirconia particles 61. As illustrated in FIG. 7, the granular particles 60 may include unagglomerated yttria particles 62. Specifically, the gas sensor powder 6 can be composed of an agglomerate of granular particles 60.

The granular particles 60 contain agglomerated particles 620 with an agglomerated particle diameter of 1 µm or more. If there are no agglomerated particles 620 having an agglomerated particle diameter of 1 µm or more, the total area ratio (A+B) % in the solid electrolyte 21 cannot be 10% or more when the solid electrolyte 21 is produced. It can be considered that this is due to the fact that, in the latter case, the yttria particles 62 are uniformly dispersed in the granular particles 60, and as a result, the yttria becomes uniformly dissolved in the zirconia, even during firing. Hence, segregation of yttria is less likely to occur, and so an unstable phase is readily formed. On the other hand, if there are agglomerated particles 620 having an agglomerated particle diameter of 1 µm or more, then the total area ratio (A+B) % in the solid electrolyte 21 can be made 10% or more when the solid electrolyte 21 is produced. It can be considered that this is because, as illustrated in FIG. 7, the yttria particles 62 are not present uniformly in the granular particles 60, and as a result of the non-uniform presence of yttria even during firing, segregation of yttria is likely to occur, and so an unstable phase becomes unlikely to be formed. The granular particles 60 may contain agglomerated particles 620 having an agglomerated particle diameter of less than 1 µm, so long as they also contain agglomerated particles 620 having an agglomerated particle diameter of 1 µm or more.

The solid electrolyte 21 of the gas sensor 1 can be made by adding a suitable binder or the like to the gas sensor powder 6 of the present embodiment, to form a molded product, then firing the obtained molded product. This is because, with the above configuration, the yttria can be segregated when in the state of a molded body, and hence a solid electrolyte 21 in which the yttria is segregated can be made by firing such a molded body. Conventional known molding methods, firing conditions, etc. can be applied for the molded body. Hence the gas sensor powder 6 of the present embodiment enables a solid electrolyte 21 to be produced that is capable of suppressing a decrease in strength due to thermal cycling.

The area ratio C, with respect to the cross-section of a granular particle 60, of agglomerated particles 620 having, an agglomerated particle diameter of 1 μm or more, can be made 0.5% or more and less than or equal 4%. With that configuration, the total area ratio (A+B) % in the obtained solid electrolyte 21 can be at least 20% and less than or equal to 98%. Hence, as with the first embodiment described above, a solid electrolyte 21 can be produced in which a decrease in strength is effectively suppressed, by reducing the unstable regions 213. If the area ratio C exceeds 4%, the degree of segregation of the yttria particles 62 in the granular particles 60 becomes excessive and the total area ratio (A+B) % in the solid electrolyte 21 becomes more than 98%, so that the strength of the solid electrolyte 21 tends to decrease slightly after exposure to thermal cycling.

The average particle size of a granular particle 60 can be made 20 μm or more and less than or equal to 100 μm, for example. This configuration has the advantage that the fluidity is high when the mold is being filled, and so the solid electrolyte 21 is less likely to have defects. The average particle size of a granular particle 60 is the average value of the maximum outer diameter values of 10 granular particles 60, as measured by SEM observation. Furthermore, the granular particles 60 preferably comprise a plurality of agglomerated particles 620 having an agglomerated particle diameter of 2 μm or more and less than 15 μm. With that configuration, the solid electrolyte 21 can be reliably produced. In addition, there are advantages such as higher oxygen ion conductivity.

The $Y_2O_3/(ZrO_2+Y_2O_3)$ mol % of the granular particles 60 can be measured by SEM-EDX analysis. Furthermore, the agglomerated particle diameter of the agglomerated particles 620 and the area ratio C of the agglomerated particles 620 having an agglomerated particle diameter of 1 μm or more, with respect to the cross-sectional area of a granular particle 60, can be measured by SEM-EDX analysis and image processing. These measurement methods are described hereinafter in experiment examples. Furthermore, an example of the method of producing the gas sensor powder 6 of the present embodiment is described hereinafter in a third embodiment.

Third Embodiment

Figure 8:
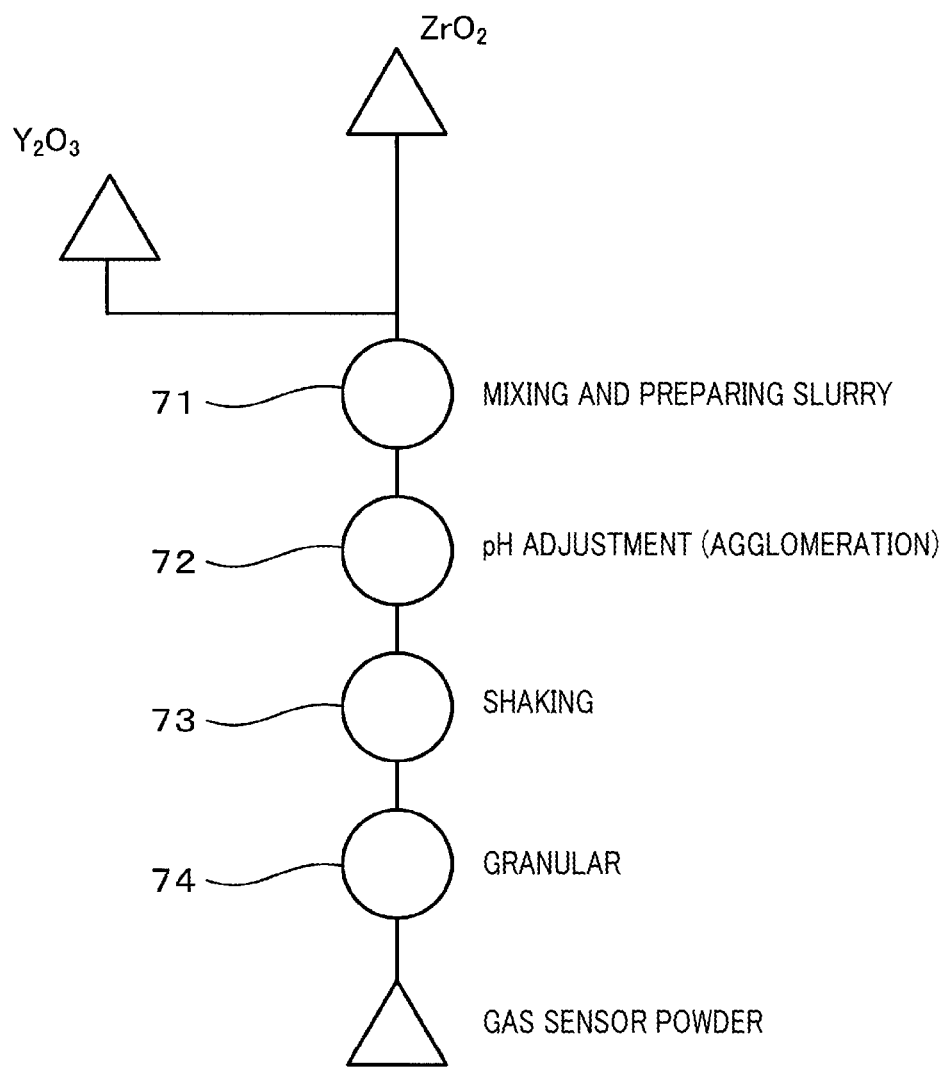
FIG. 8 is an explanatory diagram showing a method of producing a powder for a gas sensor according to a third embodiment.

A method of producing a gas sensor powder according to a third embodiment will be described with reference to FIG. 8. The method of producing a gas sensor powder according to the present embodiment (which may be simply referred to as "the present production method" in the following) can be used for producing the gas sensor powder 6 of the second embodiment. As shown in FIG. 8, the present manufacturing method includes a slurry preparation step 71, a slurry pH adjustment step 72, a slurry shaking step 73, and a powdering step 74.

In the slurry preparation step 71, a $Y_2O_3$ powder and a $ZrO_2$ powder are blended such that the mol % of $Y_2O_3$ relative to the total of $ZrO_2$ and $Y_2O_3$ is 3.5 mol % or more and 6.9 mol % or less, then mixed with a solvent and an acid, and the pH of the slurry is adjusted to be 3 or more and less than or equal to 4.

The average particle size of the $Y_2O_3$ powder can be selected from within the range of 0.01 to 10 μm, and the average particle size of the $ZrO_2$ powder can be selected from within the range of 0.5 to 30 μm. The average particle size is the particle diameter size d50 when the volume-based cumulative frequency distribution, as measured by the laser diffraction/scattering method, is shown as 50%. Examples of the solvent include polar solvents such as water, ethanol, methanol, and ethylene glycol. Examples of the acid include halogen-free acids such as acetic acid, formic acid, and nitric acid.

The slurry pH adjustment step 72 is a step in which an alkaline solution is added to the slurry, to adjust the alkalinity of the slurry to have a pH of 10 or more and 12.

Examples of the alkaline solution include an aqueous solution containing at least one of an alkali metal and an alkaline earth metal, an alkaline aqueous solution containing neither an alkali metal nor an alkaline earth metal, and the like. Examples of the former aqueous solution include a NaOH aqueous solution, and examples of the latter aqueous solution include an ammonia aqueous solution. It is preferable to use an aqueous ammonia solution containing neither an alkali metal nor an alkaline earth metal. This is because alkali metals and alkaline earth metals are likely to adversely affect the sensor performance of a gas sensor.

When the pH of the slurry is adjusted to have an alkalinity of 10 or more and 12 or less, the zeta potential of the $Y_2O_3$ approaches 0. As a result, the zirconia particles do not agglomerate, but the yttria particles tend to agglomerate. Hence, by adjusting the pH of the slurry beforehand to have an alkalinity of 10 or more and 12 or less, it becomes possible to move the yttria particles such as to collide with one other in the subsequent slurry shaking step 73, and thereby agglomerate them.

The slurry shaking step 73 is a step of shaking the slurry whose pH has been adjusted to be alkaline, so that the yttria particles in the slurry are moved to collide with each other and become agglomerated.

The powdering step 74 is a step of drying and granulating the slurry to obtain a gas sensor powder 6 having granular particles 60 that comprise a plurality of zirconia particles 61 and a plurality of yttria particles 62.

The slurry can be dried and granulated by a spray dryer for example.

The solid electrolyte 21 of the gas sensor 1 can be made by executing a molding step of molding the gas sensor powder 6 obtained as described above to form a molded body and a firing step of firing the formed molded body. Examples of the firing conditions include a firing temperature of 1200° C. to 1500° C. and a firing time of 0.5 hours to 24 hours.

EXPERIMENT EXAMPLES

Measurement Methods (1) Method of measuring the area ratio A of the first stable region, the area ratio B of the second stable region, and the total area ratio (A+B) % in the cross section of the solid electrolyte.

Figure 9:
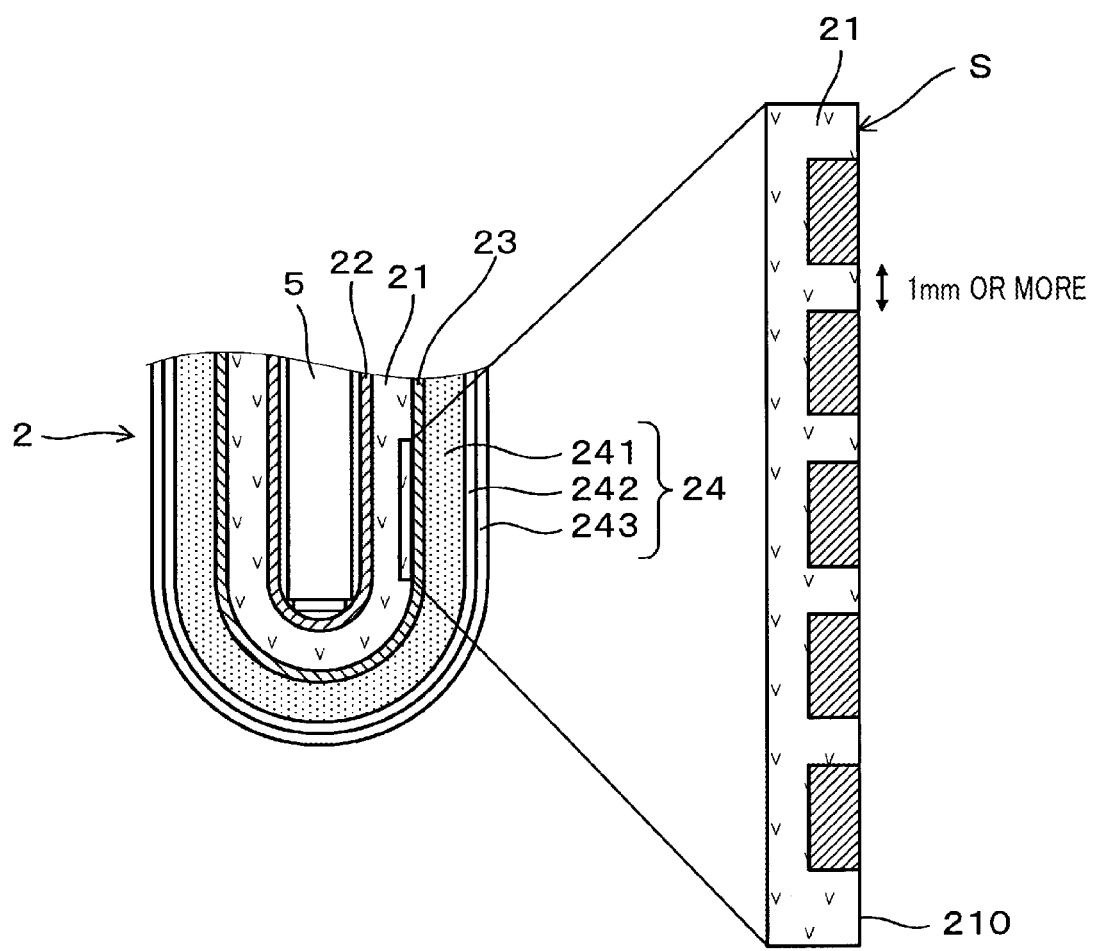
FIG. 9 is an explanatory diagram of a measurement sample of a solid electrolyte, to be used for SEM-EDX analysis.

As shown in FIG. 9, the solid electrolyte 21 was polished so that, as shown in FIG. 9, the central axis along the longitudinal direction of the solid electrolyte 21 was included in the cross section, and the measurement sample S was prepared. Using the EDX of the SEM-EDX analyzer, element information data was acquired for a surface region on the exhaust gas side in the measurement sample S. At that time, the S8000 SEM-EDX device made by Hitachi High-Technologies Corporation, with a Flat Quad made by Bruker, was used as the SEM-EDX device.

The measurement conditions of the SEM at the time were an acceleration voltage of 15 kV, a current of 15 pA, and a measurement magnification of 10,000 times (10 k). The surface region used for acquiring element information data included the surface 210, on which the exhaust gas impinges and which has a size of 12 μm in the longitudinal direction and 9 μm in the thickness direction of the solid electrolyte 21. The element information data was acquired using the hyper-mapping function of the EDX device under the measurement conditions of filter: sharp, resolution: ¼, and measurement time: 600 s.

The acquired element information data was processed using the quantitative mapping function of the EDX device. At this time, quantification is made with the selected elements of only the Y (yttrium) element and the Zr (zirconium) element. Next, only the Y element was selected as the display element in the quantitative mapping image, and the data processing software in the EDX device was set such as to further provide a display in atom %. The conversion from the atom % of Y with respect to the sum of Zr and Y (which may be referred to in the following as Y/(Zr+Y) atom %)) to the mol % of the sum of $ZrO_2$ and $Y_2O_3$ with respect to $Y_2O_3$ ($Y_2O_3/(ZrO_2+Y_2O_3)$ mol %) can be carried out by the following equation 1:

$$A/(A+2\times(100-A)) \qquad \text{equation 1}$$

where A represents Y/(Zr+Y) atom %.

Figure 10:
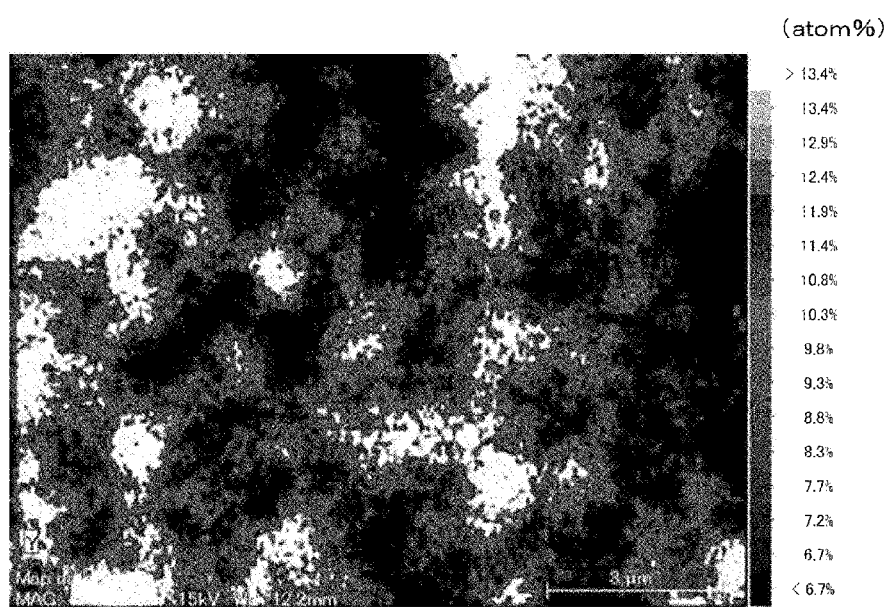
FIG. 10 is a diagram showing an example of a quantitative mapping image of the Y element, expressed in atom %, obtained by SEM-EDX analysis of a solid electrolyte.

When the Y/(Zr+Y) atom % corresponding to a $Y_2O_3/(ZrO_2+Y_2O_3)$ mol % of 3.3 is calculated from the above equation 1, the result is 6.7 atom %. Similarly, when the Y/(Zr+Y) atom % corresponding to a $Y_2O_3/(ZrO_2+Y_2O_3)$ mol % of 7 is calculated, the result is 13.4 atom %. When the color palette of data processing software in the above EDX device was adjusted such that the regions where Y/(Zr+Y) atom % was 6.7 atom % or less were displayed black and the regions where Y/(Zr+Y) atom % was 13.4 atom % or more were displayed white, a quantitative mapping image showing the Y element in atom % (which hereinafter may be referred to as a Y mapping image) was obtained for the solid electrolyte 21, as shown in FIG. 10.

Next, the Y mapping image obtained as described above was subjected to image processing for calculating the area ratio of the regions, within a cross section of the measurement sample S of the solid electrolyte 21, having $Y_2O_3/(ZrO_2+Y_2O_3)$ mol % of 3.3 mol % or less.

The ImageJ software produced by the U.S. National Institute of Health (NIH) was used as the image processing software. The ImageJ version used was 1.52a. Specifically, the image type was changed to 8-bit by using the ImageJ image tool. Next, as shown in FIGS. 11(a) and 11(b), the threshold selection tool of ImageJ was used to set the extraction area to be red, and to set the threshold such as to extract the above-described black regions, in which Y/(Zr+Y) atom % is 6.7 atom % or less. It should be noted that the color of the extraction region 91 in FIG. 11A is actually red. Next, regions within a range of 12 μm in width and 9 μm in length were selected with the ImageJ area selection tool. Next, area fraction checking was performed, as: ImageJ Analysis→Measurement→Result→Set Measurement When this was done, a numeric value called area % appeared in the ImageJ Result column, and that value was recorded as the area ratio $A_1$ of the entire cross section of the regions, within the cross section of the solid electrolyte 21 of the measurement sample S, in which $Y_2O_3/(ZrO_2+Y_2O_3)$ mol % is 3.3 mol % or less.

Next, the Y mapping image obtained as described above was image-processed in the same manner as described above, to obtain the area ratio B of the entire cross section of the regions, within the cross section of the solid electrolyte 21 of the measurement sample S, in which $Y_2O_3/(ZrO_2+Y_2O_3)$ mol % is 7 mol % or more. At this time, as shown in FIGS. 12(a) and 12(b), the ImageJ threshold selection tool was used to set the extraction regions red in color, and to set the threshold such as to extract the above-described white regions, in which Y/(Zr+Y) atom % is 13.4 atom % or more. It should be noted that the color of the extraction region 92 in FIG. 12A is actually red. Next, regions within a range of 12 μm in width and 9 μm in length were selected with the ImageJ area selection tool. Next, area fraction checking was performed, as: ImageJ Analysis→Measurement→Result→Set Measurement When this was done, a numeric value called area % appeared in the ImageJ Result column, and that value was recorded as the area ratio $B_1$ of the entire cross section of the regions, within the cross section of the solid electrolyte 21 of the measurement sample S, in which $Y_2O_3/(ZrO_2+Y_2O_3)$ mol % is 7 mol % or more.

Next, $(A_1+B_1)$ was calculated by summing the area ratios $A_1$ and $B_1$ obtained above. This procedure was carried out for each of the sets of element information data acquired from the five surface regions on the exhaust gas side of the measurement sample S, and the area ratios $A_1$ to $A_5$, the area ratios $B_1$ to $B_5$, and the total area ratios $(A_1+B_1)\sim(A_5+B_5)$ were calculated. As shown in FIG. 9, the five surface regions on the exhaust gas side in the measurement sample S were set so that the distance between the surface regions was at least 1 mm or more. The arithmetic mean value of the five total area ratios $(A_1+B_1)$ to $(A_5+B_5)$ obtained was then taken to be the total area ratio (A+B) % in the cross section of the solid electrolyte 21.

(2) Method of measuring $Y_2O_3/(ZrO_2+Y_2O_3))$ mol % in an entire cross section of the solid electrolyte In the same manner as for the above-described <(1) Method of measuring the area ratio A of the first stable region, the area ratio B of the second stable region, and the total area ratio (A+B) % in the cross section of the solid electrolyte>, the element information data acquired for the surface regions on the exhaust gas side in the measurement sample S was processed, using the surface analysis function, to calculate the average value for all of the regions selected by the data processing software of the EDX apparatus. At this time, the field of view of the surface region which was the measurement location was selected, and quantification is made with the selected elements of only the Y (yttrium) element and the Zr (zirconium) element. The Y/(Zr+Y) atom % contained in the entire surface region of the measurement location was then obtained, and by converting this using the above equation 1, the $Y_2O_3/(ZrO_2+Y_2O_3)$ mol % contained in the entire surface region of the measurement location was obtained.

This procedure was carried out for each set of element information data acquired from the five surface regions on the exhaust gas side in the measurement sample S shown in FIG. 9, with the $Y_2O_3/(ZrO_2+Y_2O_3)$ contained in the entire surface region being calculated in each case. Then, an arithmetic mean value of $Y_2O_3/(ZrO_2+Y_2O_3)$ mol % contained in the obtained five surface regions is determined as $Y_2O_3/(ZrO_2+Y_2O_3)$ in an entire cross section of the solid electrolyte.

(3) Method of measuring the area ratio C of agglomerated particles having an agglomerated particle diameter of 1 μm or more with respect to the cross-section of a granular particle of the gas sensor powder.

After embedding the granular particles in a resin, a cross section was obtained by polishing such as to pass through the centers of the granular particles, and a measurement sample was prepared. Element information data was then obtained from the cross section of the measurement sample, by using the EDX of the SEM-EDX analysis apparatus. The S8000 SEM-EDX apparatus made by Hitachi High-Technologies Corporation, with a Bruker FlatQUAD, was used as the SEM-EDX apparatus. The SEM measurement conditions at the time were an acceleration voltage of 15 kV, a current of 15 μA, and a measurement magnification of 1,100 times (1.1 k). The hyper mapping function of the EDX apparatus was used in acquiring the element information data, with the measurement conditions being: filter: sharp, resolution: ¼, and measurement time: 600 s.

The acquired element information data was processed using the quantitative mapping function of the EDX device. At this time, quantification is made with the selected elements of only the Y (yttrium) element and the Zr (zirconium) element. Next, the Y element was selected as the display element of the quantitative mapping image, and the data processing software in the EDX device was set such as to further display in atom %. Next, using the above equation 1, the Y/(Zr+Y) atom % corresponding to a $Y_2O_3/(ZrO_2+Y_2O_3)$ mol % of 10 mol % was calculated, with the result being 20 atom %. The color palette of the data processing software of the EDX was therefore adjusted such that the regions in which Y/(Zr+Y) atom % was 20 atom % or more became white. A quantitative mapping image (Y mapping image) of the atom % values of the displayed Y element in the granular particles was thereby obtained, of the form shown in FIG. 13.

Figure 13:
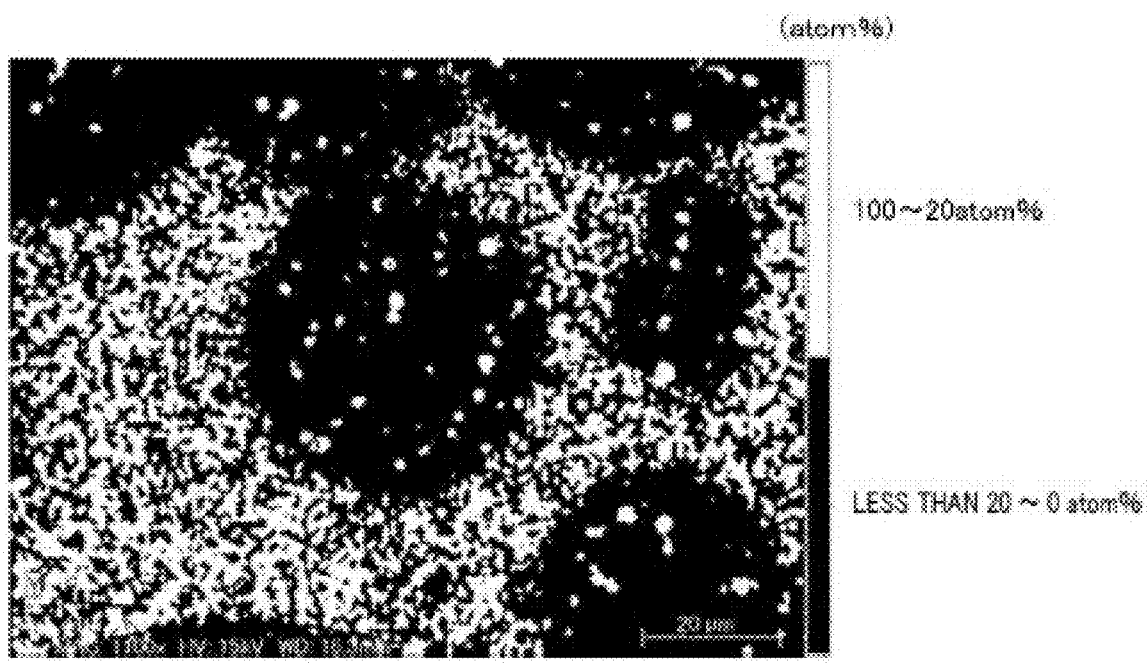
FIG. 13 is a diagram showing an example of a quantitative mapping image of the Y element displayed in atom %, obtained by SEM-EDX analysis of granular particles included in a gas sensor powder.
Figure 14:
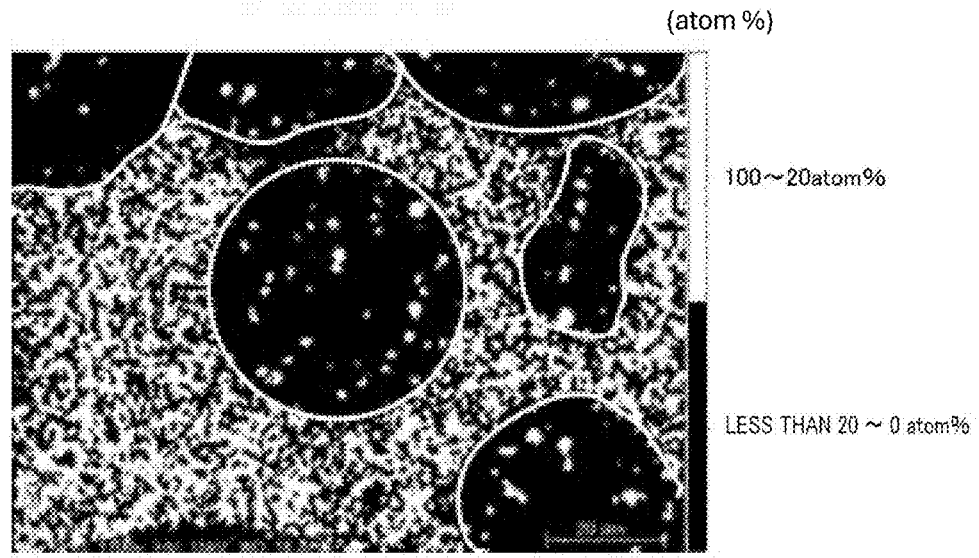
FIG. 14 is a diagram showing a state in which the outer circumferences of the granular particles shown in the quantitative mapping image of the Y element in FIG. 13 are marked by lines.
Figure 15:
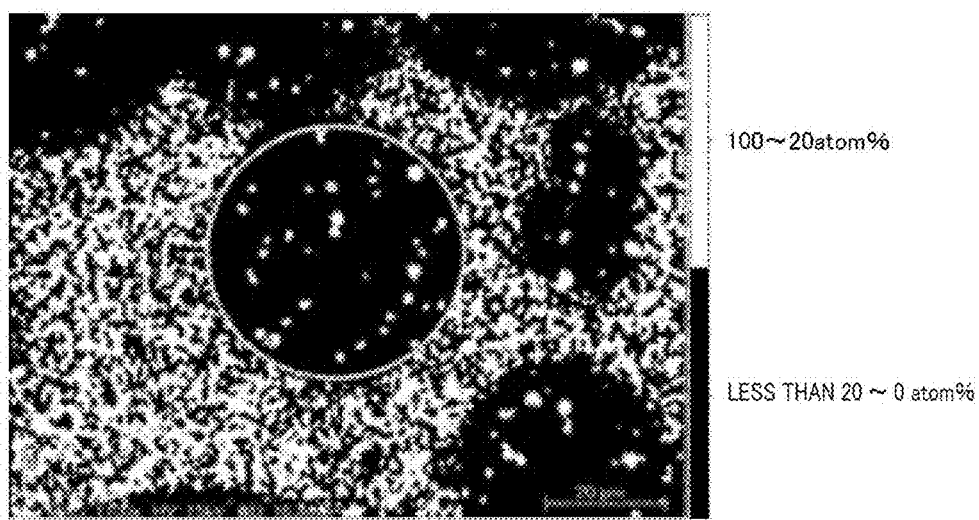
FIG. 15 is a quantitative mapping image of the Y element, in which the central granular particle of the plurality of granular particles contained in FIG. 14 is corrected by painting the agglomerated particles having an agglomerated particle diameter of less than 1 μm in black.
Figure 16:
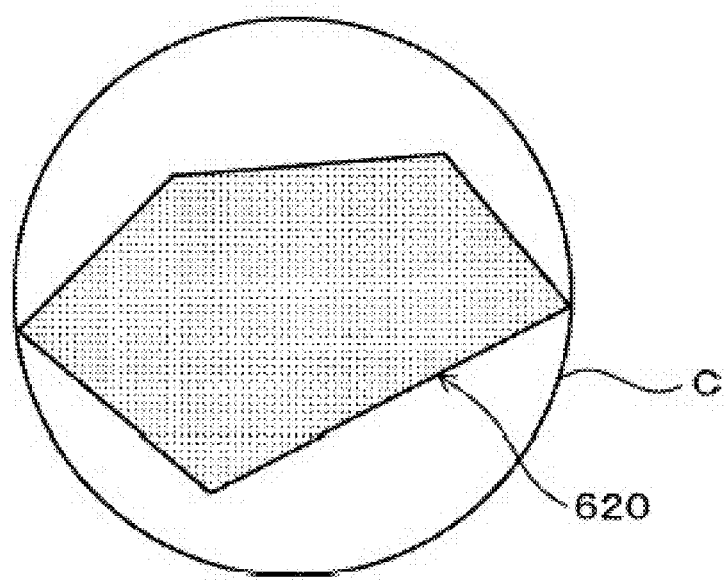
FIG. 16 is a diagram for explaining the agglomerated particle diameter of an agglomerated particle.

Next, to exclude parts of the Y mapping image of FIG. 13 in which resin portions are mistakenly recognized as Y portions, the image was compared with the SEM image, and the outer peripheries of the granular particles were surrounded by lines, as shown in FIG. 14. One of the plurality of granular particles included in FIG. 14, whose outer shape was within the visual field and represented an entire granular particle, was then selected as the measurement target. In this example, the central one of the plurality of granular particles included in FIG. 14 was selected. Next, the agglomerated particle diameters of the agglomerated particles (the white spots within the line enclosing the central granular particle in FIG. 14) in the selected granular particle were measured, and those of the agglomerated particles having an agglomerated particle diameter less than 1 μm were set to black. As a result, a modified Y-mapping image as shown in FIG. 15 was obtained. As illustrated in FIG. 16, the agglomerated particle diameter of an agglomerated particle 620 in the Y mapping image is the diameter of the smallest circle C that can enclose the agglomerated particle. When a granular particle contains agglomerated particles with an agglomerated particle diameter of 1 μm or more, white spots always remain in the region of the granular particle, as shown in the image of FIG. 15.

Next, the modified Y-mapping image obtained as described above was image-processed to calculate, for the agglomerated particles in the cross section of the granular particle in the measurement sample, the area ratio C of those agglomerated particles having an agglomerated particle diameter of 1 μm or more. The ImageJ apparatus of the U.S. National Institutes of Health (NIH) was used as the image processing software. The ImageJ version was 1.52a. Specifically, the image type was changed to 8-bit by using the ImageJ image tool. Next, as shown in FIGS. 17(a) and 17(b), the ImageJ threshold selection tool was used to make the extracted regions red in color, and to set the threshold such as to extract the above-described white regions in which Y/(Zr+Y) atom % is 20 atom % or more. It should be noted that the color of the extracted regions 93 in FIG. 17(a) is actually red. Next, regions having the external shape of a granular particle were selected using the ImageJ area selection tool. Area fraction checking was then performed, using the ImageJ Analysis→Measurement→Result→Set Measurement of the ImageJ. When this was done, a numeric value named area % appeared in the ImageJ Result column, and that value was recorded as the area ratio $C_1$ of the agglomerated particles having an agglomerated particle diameter of 1 μm or more.

This procedure was carried out for each of the sets of element information data respectively obtained from five different cross sections in the measurement sample, to calculate the area ratios $C_1$ to $C_5$. The arithmetic mean value of the five area ratios $C_1$ to $C_5$ obtained was then taken to be the area ratio C, in a cross section of a granular particle, of the agglomerated particles having an agglomerated particle diameter of 1 μm or more.

(4) Method of measuring $Y_2O_3/(ZrO_2+Y_2O_3)$ mol % in granular particles of gas sensor powder.

Measurement was performed in the same manner as for the above <(3) Measurement method of area ratio of agglomerated particles having an agglomerated particle diameter of 1 μm or more, in a cross-section of a granular particle of the gas sensor powder>. The element information data acquired for a cross section of the sample was processed by using the quantitative mapping function of the above EDX device. At this time, all of the measured granular particles were selected, and quantified with only the Y element and the Zr element as the selected elements. The Y/(Zr+Y) atom % contained in the granular particles within the entire field of view of the measurement location, excluding the resin portions, was then obtained, and converted by the above equation 1 to obtain the $Y_2O_3/(ZrO_2+Y_2O_3)$ mol % of the granular particles.

<Experiment Example 1>—Relationship Between $Y_2O_3/(ZrO_2+Y_2O_3)$ Mol % in an Entire Cross Section of the Solid Electrolyte and Water Exposure Strength A slurry was prepared by mixing $Y_2O_3$ powder and $ZrO_2$ powder and adding water as a solvent and acetic acid as an acid, such as to make the mol % of $Y_2O_3$ relative to the total of $ZrO_2$ and $Y_2O_3$ become 3.5 mol % or more and less than or equal to 6.9 mol %, and less than 3.5 mol % or 6.9 mol % or more. At this time, the pH of the slurry was set in the range of 3 to 4. The average particle size of the $Y_2O_3$ powder was selected from within the range of 0.01 to 10 μm, and the average particle size of the $ZrO_2$ powder was selected from within the range of 0.5 to 30 μm.

Next, aqueous ammonia was added, as an alkaline solution, to the slurry whose pH had been adjusted to within the range of 3 to 4, and the pH of the slurry was adjusted to within the range of 10 to 12. The slurry was then slowly shaken, so that the yttria particles in the slurry became agglomerated by being moved and colliding with each other. The resultant slurry was then dried and granulated, using a spray dryer. Powders for respective gas sensors, each gas sensor powder having granular particles with different values of $Y_2O_3/(ZrO_2+Y_2O_3)$ mol %, were thereby obtained. It should be noted that each of these gas sensor powders, in which the $Y_2O_3$ particles and $ZrO_2$ particles were mixed such that $Y_2O_3/(ZrO_2+Y_2O_3)$ mol % became 3.5 mol % or more and less than or equal to 6.9 mol %, contained agglomerated particles formed by agglomeration of yttria particles and having an agglomerated particle diameter of 1 μm or more.

Next, each gas sensor powder was placed in a mold and pressurized, to obtain respective molded products. Each molded product was then fired at 1350° C. for 1 hour to obtain respective solid electrolytes. In this example, each solid electrolyte has a bottomed cylindrical cup-shaped form. Next, for each of the solid electrolytes, the $Y_2O_3/(ZrO_2+Y_2O_3)$ mol % in an entire cross section of the solid electrolyte, and the total area ratio (A+B) % in the cross section of the solid electrolyte, were determined by using the above-described measuring method. It should be noted that these solid electrolytes, having $Y_2O_3/(ZrO_2+Y_2O_3)$ mol % of 3.5 mol % or more and 6.9 mol % or less, had a total area ratio (A+B) % of 10% or more in an entire cross section.

Next, the solid electrolytes were used to produce respective gas sensor elements of the form shown in FIG. 2. In this example, the first protective layer is made of alumina magnesium spinel and has a layer thickness of 100 μm. The second protective layer is made of γ-alumina and has a layer thickness of 50 μm. The third protective layer is made of γ-alumina and has a layer thickness of 50 μm. A gas sensor element having a protective layer is used in this example since the protective layer makes it difficult for water to pass through, and therefore such a gas sensor element is more suitable for a test of water exposure strength.

Figure 18:
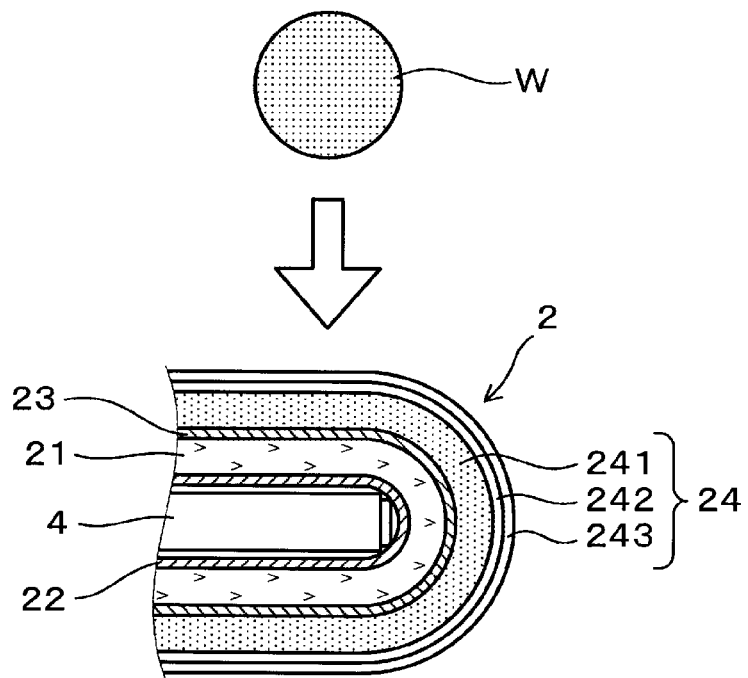
FIG. 18 is a diagram for explaining a method of measuring the water exposure strength of a solid electrolyte in Experiment Example 1.
Figure 19:
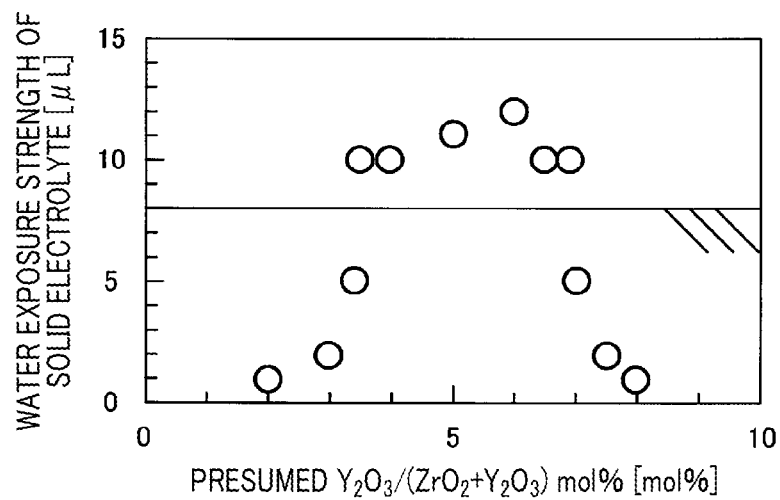
FIG. 19 is a diagram showing the relationship between $Y_2O_3/(ZrO_2+Y_2O_3)$ [mol %] in the entire cross section of a solid electrolyte, obtained in Experiment Example 1 and the water exposure strength [μL] of the solid electrolyte.

As illustrated in FIG. 18, a gas sensor element 2 was heated to 600° C. by a heater 5, and a water droplet W of 1 μL was dropped on the tip of the element. The initial value of the impedance Zac of the gas sensor element was then measured. The operation of dropping a water droplet W of 1 μL on the tip of the element and measuring the impedance value Zac was successively repeated. This successive repetition of the procedure for obtaining impedance values Zac was performed for each of the gas sensor elements. For each of the gas sensor elements, the water exposure strength of the solid electrolyte of the gas sensor element was defined as the total amount of the water droplets W that had been dropped by the time that the impedance value Zac of the gas sensor elements fluctuated by ±10% with respect to the initial impedance value. The results are shown in FIG. 19. In FIG. 19, values along the horizontal axis are those of $Y_2O_3/(ZrO_2+Y_2O_3)$ mol % in the entire cross section of the solid electrolyte, that is, the assumed $Y_2O_3/(ZrO_2+Y_2O_3)$ mol. %. The values along the vertical axis are those of the water exposure strength (μL) of the solid electrolyte.

As shown in FIG. 19, if the assumed $Y_2O_3/(ZrO_2+Y_2O_3)$ mol % was less than 3.5 mol % or greater than 6.9 mol %, the water exposure strength decreased. It can be considered that this is because the difference in coefficient of thermal expansion between the solid electrolyte and the electrode becomes large, so that stress is generated due to a temperature drop when the gas sensor is exposed to water, and peeling of the electrode occurs. On the other hand, if the assumed $Y_2O_3/(ZrO_2+Y_2O_3)$ mol % was 3.5 mol % or more and 6.9 mol % or less, a high value of water exposure strength was obtained. It can be considered that this is because the difference in the coefficient of thermal expansion between the solid electrolyte and the electrode becomes relatively small, so that when the solid electrolyte is exposed to water, stress is less likely to be generated due to a temperature drop, and hence peeling of the electrode is less likely to occur. Furthermore it was also confirmed that if the solid electrolyte has an assumed $Y_2O_3/(ZrO_2+Y_2O_3)$ mol % of 3.5 mol % or more and less than or equal to 6.9 mol %, the water exposure strength is 8 μL or more. This is suitable for the solid electrolyte of a cup-type gas sensor element, which requires a high degree of water exposure strength.

<Experiment Example 2>—Relationship Between $Y_2O_3/(ZrO_2+Y_2O_3)$ Mol % within Crystal Grains and Phase Transformation After measuring $Y_2O_3/(ZrO_2+Y_2O_3)$ mol % as described above, using SEM-EDX, for a single point in one crystal grain in the cross section of the solid electrolyte, the crystal phase was identified using EBSD (electron backscattering). It should be noted that in the measurement, a cross section of the solid electrolyte was scratched with a diamond pen or the like, the scratch and the grain boundaries were used as marks in the SEM image, and a single point in the crystal grain, which was not affected by the scratch, was set as the measurement location. Next, a thermal history was applied to the solid electrolyte, in which the temperature was raised from 100° C. to 950° C. in 10 minutes and lowered from 950° C. to 100° C. in 10 minutes. The crystal phase at the same location as above was then identified, again using EBSD (electron backscattering). This procedure was repeated, as one cycle, for 20 cycles.

The JSM-7900F made by the JEOL company, with the Symmetry made by the Oxford company attached, was used as the EBSD apparatus. At this time, the measurement conditions were an acceleration voltage of 20 kV, a measurement magnification of 10,000 times (10 k), and a sample inclination of 70. The crystal phases to be analyzed were the M phase, the C phase, and the T phase of $ZrO_2$.

As a result of the above measurement, the crystal phases at the measurement site, when $Y_2O_3/(ZrO_2+Y_2O_3)$ mol % was 4 mol %, were as follows:
Initial phase: M phase, after 1 cycle: M phase, after 2 cycles: M phase, after 3 cycles: C phase or T phase, after 4 cycles: C phase or T phase, after 5 cycles: M phase, after 6 cycles: M phase, after 7 cycles: M phase, after 8 cycles: M phase, after 9 cycles: M phase, after 10 cycles: C phase or T phase, after 11 cycles: C phase or T phase, after 12 cycles: M phase, After 13 cycles: M phase, after 14 cycles: M phase, after 15 cycles: M phase, after 16 cycles: M phase, after 17 cycles: M phase, after 18 cycles: M phase, after 19 cycles: M phase, after 20 cycles: M phase.

In this example, the phase transformation from the M phase to the C phase or the T phase occurred from the second cycle to the third cycle, and phase transformation from the C phase or the T phase to the M phase occurred from the second cycle to the third cycle. Furthermore, the phase transformation from the M phase to the C phase or the T phase occurred from the 9th cycle to the 10th cycle, and the phase transformation from the C phase or the T phase to the M phase occurred from the 11th cycle to the 12th cycle. Hence, the total number of phase transformations in this example is four. However, it should be noted that a phase transformation between the C phase and the T phase may also occur. The C phase and the T phase cannot be distinguished from one another by using EBSD, because their crystal structures are very similar However, the rate of volume change due to the phase transformation between the C phase and the T phase is almost zero, and hence residual stress does not occur. Thus, this phase transformation can be ignored. In addition, XRD, which is often used for identification of crystal phases, is a macro evaluation method, and hence cannot be used to observe the state of phase transformation for individual crystal grains before and after imposing the thermal history.

The same test as above was performed for locations where the values of $Y_2O_3/(ZrO_2+Y_2O_3)$ mol % were respectively different, and the relationship between $Y_2O_3/(ZrO_2+Y_2O_3)$ mol % and the total number of phase transformations was investigated. The results are shown in Table 1. It should be noted that the greater the total number of phase transformations, the more unstable the measurement region is evaluated to be.

TABLE 1

| $Y_2O_3/(ZrO_2 + Y_2O_3)$ mol % | Total number of phase transformations when a thermal history of 20 cycles was imposed |
| --- | --- |
| 3.0 mol % | 0 times |
| 3.3 mol % | 0 times |
| 3.4 mol % | 2 times |
| 4.0 mol % | 4 times |
| 4.5 mol % | 8 times |
| 5.0 mol % | 8 times |
| 5.5 mol % | 6 times |
| 6.5 mol % | 4 times |
| 6.9 mol % | 2 times |
| 7.0 mol % | 0 times |
| 7.5 mol % | 0 times |

According to Table 1, it was confirmed that a region in the cross section of the solid electrolyte where $Y_2O_3/(ZrO_2+Y_2O_3)$ mol % is 3.3 mol % or less, and a region where $Y_2O_3/(ZrO_2+Y_2O_3)$ mol % is 7 mol % or more, are stable regions in which phase transformations due to thermal cycling are unlikely to occur. On the other hand, it was confirmed that a region in the cross section of the solid electrolyte where $Y_2O_3/(ZrO_2+Y_2O_3)$ mol % is 3.4 mol % or more, and a region where $Y_2O_3/(ZrO_2+Y_2O_3)$ mol % is 6.9 mol % or less, are unstable regions in which phase transformations due to thermal cycling are liable to occur. From this result, it is found that the boundary between the stable phase and the unstable phase in the solid electrolyte, at the operating temperature of the gas sensor, is defined by $Y_2O_3/(ZrO_2+Y_2O_3)$ mol % in the crystal phase.

<Experiment Example 3>—Relationship Between the Total Area Ratio (A+B) % in the Solid Electrolyte and Strength after Thermal Cycling—

In the same manner as in <Experiment Example 1>, solid electrolytes having respectively different total area ratios (A+B) % of 10% or more were prepared. The total area ratio (A+B) % was varied by adding an alkaline solution for adjusting the pH of the slurry and by changing the firing time and firing temperature, when producing respective gas sensor powders.

Furthermore, comparative-use gas sensor powders were produced without performing adjustment of the pH of the slurry by adding an alkaline solution and without performing shaking of the slurry for agglomerating the yttria particles by collisions between them, as was performed in <Experiment Example 1>, Respective solid electrolytes having a total area ratio (A+B) % of less than 10% were prepared using the comparative-use gas sensor powders. In this example, the solid electrolytes were formed with a plate-like shape.

Figure 20:
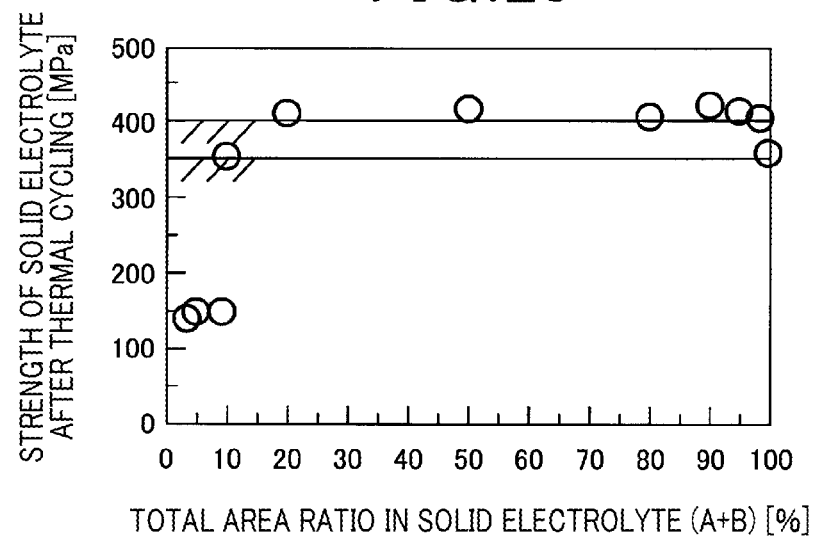
FIG. 20 is a diagram showing the relationship between the total area ratio (A+B) % in the cross section of the solid electrolyte, obtained in Experiment Example 3, and the strength of the solid electrolyte after the thermal cycling.

A sample having a width of 5 mm and a length of 45 mm was collected from each of the solid electrolytes. The collected samples were subjected to thermal cycling from room temperature to 950° C. which was repeated 1000 times, with a temperature increase/decrease rate of ±950° C./10 minutes. Test pieces to be subjected to the 4-point bending strength test specified in JIS R1601 were collected from the respective samples after the thermal cycling, and the 4-point bending strength test was performed on each test piece. The 4-point bending strength test was performed 10 times on each test piece. The average value of the results of 10 measurements of the 4-point bending strength of the test piece was taken as the 4-point bending strength of the test piece. A laminated gas sensor element should have a strength of 350 MPa or more, and a cup type gas sensor element should have a strength of 400 MPa or more. The results of the above are shown in FIG. 20. In FIG. 20, the horizontal axis expresses values of the total area ratio (A+B) % in the solid electrolyte, and the vertical axis expresses values of the strength of the solid electrolyte after the thermal cycling.

As shown in FIG. 20, when the total area ratio (A+B) % in the solid electrolyte was less than 10%, the strength of the solid electrolyte became decreased after the thermal cycling. It is considered that this is due to the fact that when the total area ratio (A+B) % is less than 10%, the ratio of above-described unstable regions becomes 90% or more, and hence, when the solid electrolyte is subjected to the thermal cycling, phase transformations occur between various crystal morphologies. Stress due to the phase transformations breaks interparticle junctions in the solid electrolyte, so that the strength of the solid electrolyte decreases. On the other hand, when the total area ratio (A+B) % in the solid electrolyte was 10% or more, the strength after the thermal cycling was higher than when the total area ratio (A+B) % was less than 10%. It can be considered that this is because the ratio of the unstable regions decreased and the ratio of the stable regions increased, so that the stress due to phase transformations was reduced, fracturing of the interparticle junctions was delayed, and hence the decrease in strength of the solid electrolyte was suppressed.

In particular, when the total area ratio (A+B) % in the solid electrolyte was at least 20% and no greater than 98%, the decrease in strength after the thermal cycling was highly effectively suppressed. It is considered that this is because the ratio of the unstable regions to the stable regions, in relation to the stress caused by the phase transformations, was sufficient to ensure suppression of a decrease in strength of the solid electrolyte When the total area ratio (A+B) % of the solid electrolyte was more than 10% but less than 20%, or was more than 98%, the strength after the thermal cycling was sufficiently high, by comparison with case where the total area ratio (A+B) % was less than 10%. However, the strength tended to be slightly lower than when the total area ratio (A+B) % was 20% or more and less than 98%. From this result, it can be said that a total area ratio (A+B) % of at least 20% or of 98% or less is suitable for a cup type gas sensor element, which is required to have particularly high strength after thermal cycling. A solid electrolyte having a total area ratio (A+B) % of 10% or more and less than 20%, or of more than 98% can be considered as suitable for a laminated type of gas sensor element, which can employ a solid electrolyte having less strength than that of a cup type gas sensor element.

<Experiment Example 4>—Relationship between the total area ratio (A+B) % of a solid electrolyte and the area ratio C of agglomerated particles having an agglomerated particle diameter of 1 μm or more in a cross section of a granular particle.

In the same manner as in <Experiment Example 1> a gas sensor powder was produced having the area ratio C of agglomerated particles with an agglomerated particle diameter of 1 μm or more, relative to the cross-sectional area of a granular particle, in the range of 0.5% or more and less than or equal to 4%. A gas sensor powder having the area ratio C in the range of more than 0% and less than 4%, and a gas sensor powder having the area ratio C in a range above 4% were also produced. A powder for a comparison gas sensor having an area ratio C of 0% was also produced, in the same manner as in <Experiment Example 3>.

Figure 21:
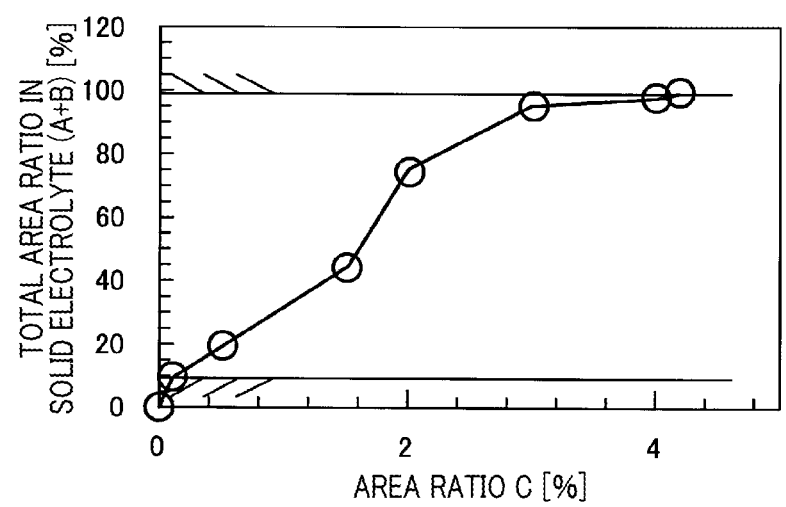
FIG. 21 is a diagram showing the relationship, obtained in Experiment Example 4, between the total area ratio (A+B) % of a solid electrolyte and the area ratio C, of the agglomerated particles having an agglomerated particle diameter of 1 μm or more, in the cross-section of a granular particle.

Using each of these gas sensor powders, respective solid electrolytes were prepared in the same manner as in <Experiment Example 1>, and the total area ratio (A+B) % in each solid electrolyte was measured. The results are shown in FIG. 21. In FIG. 21, the values along the horizontal axis express the area ratio C of the agglomerated particles having an agglomerated particle diameter of 1 μm or more, with respect to the cross-sectional area of a granular particle, and the values along the vertical axis express the total area ratio (A+B) % in the solid electrolyte.

As can be seen from FIG. 21, when the above-described area ratio C of the agglomerated particles having an agglomerated particle diameter of 1 μm or more in the cross section of a granular particle is at least 0.5% and less than 4%, the total area ratio (A+B) % in the solid electrolyte can be made at least 20% and 98% or less. Furthermore, it can be seen that when the area ratio C exceeds 4%, the total area ratio (A+B) % in the solid electrolyte becomes greater than 98%. Furthermore, it can be seen that if there are granular particles in which the area ratio C exceeds 0%, that is, if there are granular particles with agglomerated particles having an agglomerated particle diameter of 1 μm or more, then the total area ratio (A+B) % in the solid electrolyte can be made 10% or more. If the area ratio C is 0%, that is, the granular particles do not have agglomerated particles with an agglomerated particle diameter of 1 μm or more, then it is difficult to make the total area ratio (A+B) % in the solid electrolyte 10% or more.

Figure 22:
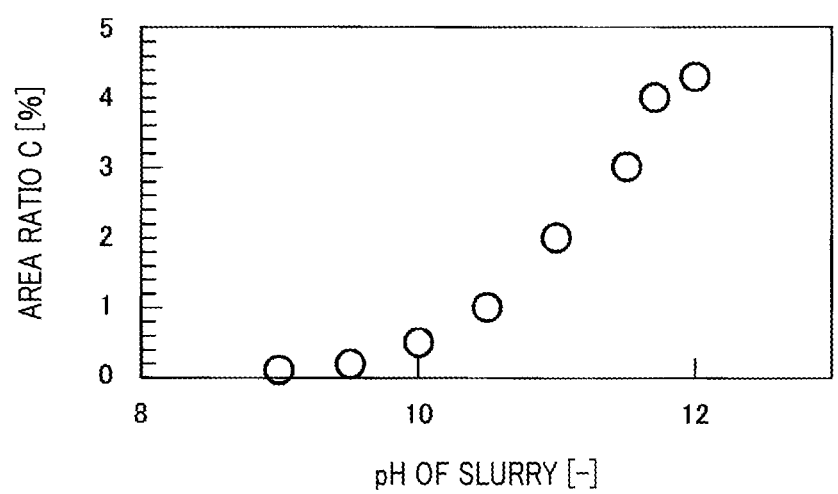
FIG. 22 is a diagram showing the relationship, obtained in Experiment Example 5, between the pH value obtained in a slurry pH adjustment step, and the area ratio C of the agglomerated particles having an agglomerated particle diameter of 1 μm or more, in the cross-section of a granular particle.

<Experiment Example 5>—Relationship Between the pH Value that is Set in the Slurry pH Adjustment Step and the Area Ratio C of the Agglomerated Particles Having an Agglomerated Particle Diameter of 1 μm or More with Respect to the Cross-Sectional Area of a Granular Particle A plurality of gas sensor powders sensors were produced. In the same manner as in <Experiment Example 1>. However, in this example, the pH of the slurry was set in the range of 9 to 12 by adjusting the amount of ammonia water that was added to the slurry. The area ratio c of the agglomerated particles having an agglomerated particle diameter of 1 μm or more with respect to the cross-sectional area of a granular particle in the obtained gas sensor powder was measured. The results are shown in FIG. 22. In FIG. 22, the values along the horizontal axis express the pH value that is set in the slurry pH adjustment step and the values along the vertical axis express the area ratio C of the agglomerated particles having an agglomerated particle diameter of 1 μm or more with respect to the cross-sectional area of a granular particle.

As shown in FIG. 22, when the pH value that is set in the slurry pH adjustment step is in the range of 10 to 12, the area ratio C of the agglomerated particles having an agglomerated particle diameter of 1 μm or more with respect to the cross-sectional area of a granular particle can be in the range 0.5% or more and less than or equal to 4.5%.

The present disclosure is not limited to the above embodiments and experiment examples, and various changes can be made without departing from the gist of the disclosure. That is, although the present disclosure has been described in accordance with the embodiments, it is understood that the disclosure is not limited to these embodiments, their configurations, etc. The scope of the present disclosure also includes various variations, and variations within a range of equivalents. In addition, various combinations and forms, including combinations and forms having only one element more, or less, are within the scope of the present disclosure.

CONCLUSION

The present disclosure provides a gas sensor having a solid electrolyte for which a decrease in strength due to thermal cycling can be suppressed, and a powder suitable for making the solid electrolyte of the gas sensor.

One aspect of the present disclosure is a gas sensor having a solid electrolyte composed of zirconia containing yttria, wherein in an entire cross section of the solid electrolyte, the solid electrolyte has $Y_2O_3$ mol % that is in the range of 3.5 mol % or more and less than or equal to 6.9 mol % relative to the total $ZrO_2$ and $Y_2O_3$ in the cross section, and wherein in a cross section of the solid electrolyte, designating A as the area ratio of the whole cross section of regions having a $Y_2O_3$ mol % of no more than 3.3 mol % relative to the total $ZrO_2$ and $Y_2O_3$, and designating B as the area ratio of the whole of the cross sections of regions having a $Y_2O_3$ mol % of at least 7 mol % with respect to the total $ZrO_2$ and $Y_2O_3$, the total area ratio (A+B) %, which is the sum of the area ratios A % and B %, is at least 10%.

Another aspect of the present disclosure is a gas sensor powder having granular particles comprising a plurality of zirconia particles and a plurality of yttria particles,
wherein
the granular particles have $Y_2O_3$ mol % of 3.5 mol % or more and less than or equal to 6.9 mol % relative to the total Zr—$O_2$ and $Y_2O_3$,
the granular particles include agglomerated particles formed by agglomeration of the yttria particles, and
the agglomerated particle diameter of the agglomerated particles is 1 μm or more.

With the gas sensor having the above configuration, it becomes possible to suppress a decrease in the strength of the solid electrolyte due to thermal cycling.

With the gas powder having the above configuration, it becomes possible to manufacture a solid electrolyte such that a decrease in the strength of the solid electrolyte due to thermal cycling is suppressed.

What is claimed is:

1. A gas sensor having a solid electrolyte composed of zirconia containing yttria, wherein the solid electrolyte includes a T phase, and, in an entire cross section of the solid electrolyte,
    the solid electrolyte has $Y_2O_3$ mol % that is in a range of 3.5 mol % or more and less than or equal to 6.9 mol % relative to a total $ZrO_2$ and $Y_2O_3$ in the entire cross section, and wherein
    designating A % as an area ratio, in the entire cross section of the solid electrolyte, of a whole cross section of regions having a $Y_2O_3$ mol % of less than or equal to 3.3 mol % relative to the total $ZrO_2$ and $Y_2O_3$ and designating B % as an area ratio, in the entire cross section of the solid electrolyte, of a whole cross section of regions having at least 7 mol % of $Y_2O_3$ relative to the total $ZrO_2$ and $Y_2O_3$, a total area ratio (A+B) %, which is the sum of A % and B %, is 10% or more.

2. The gas sensor according to claim 1, wherein the total area ratio is 20% or more and less than or equal to 98%.

* * * * *